(12) United States Patent
Uehara et al.

(10) Patent No.: US 7,416,245 B2
(45) Date of Patent: Aug. 26, 2008

(54) SUNSHADE DEVICE FOR VEHICLE

(75) Inventors: Tatsuaki Uehara, Tochigi (JP);
Teruyuki Nakamura, Tochigi (JP);
Takashi Kato, Tochigi (JP)

(73) Assignee: Yachiyo Kogyo Kabushiki Kaisya, Sayama-shi (JP)

( * ) Notice: Subject to any disclaimer, the term of this patent is extended or adjusted under 35 U.S.C. 154(b) by 98 days.

(21) Appl. No.: 11/644,823

(22) Filed: Dec. 26, 2006

(65) Prior Publication Data

US 2007/0145764 A1    Jun. 28, 2007

(30) Foreign Application Priority Data

| Mar. 3, 2006 | (JP) | ............................... 2006-057445 |
| Jun. 29, 2006 | (JP) | ............................... 2006-179881 |
| Jul. 4, 2006 | (JP) | ............................... 2006-184451 |
| Oct. 4, 2006 | (JP) | ............................... 2006-272599 |
| Dec. 27, 2006 | (JP) | ............................... 2005-374843 |

(51) Int. Cl.
*B60J 7/00* (2006.01)

(52) U.S. Cl. ..................................................... 296/214

(58) Field of Classification Search ................. 296/97.4, 296/97.11, 97.8, 97.5, 97.9, 214, 220.01; 160/113, 115, 117, 118

See application file for complete search history.

(56) References Cited

U.S. PATENT DOCUMENTS 6,409,260 B1 * 6/2002 Bohm et al. ........... 296/220.01

7,367,614 B2 * 5/2008 Uehara et al. ................ 296/214
2005/0140164 A1 * 6/2005 Wilms et al. ........... 296/107.18

FOREIGN PATENT DOCUMENTS

| JP | 8-118959 | 5/1996 |
| JP | 11-348567 | 12/1999 |
| JP | 3115646 | 9/2000 |

* cited by examiner

*Primary Examiner*—Dennis H. Pedder
*Assistant Examiner*—Melissa A Black
(74) *Attorney, Agent, or Firm*—Kratz, Quintos & Hanson, LLP

(57) ABSTRACT

A sunshade device for a vehicle includes: a plurality of sunshade panels mounted in an inner opening of a vehicular roof along a longitudinal direction of the vehicle and arranged in line in a closed state of the sunshade panels; a pair of front and rear sliders each provided at both side portions of each sunshade panel; a pair of guide rails for guiding a liner sliding movement of the front and rear sliders; a drive source connected to a forefront sunshade panel; and a connecting mechanism for detachably connecting adjacent sunshade panels such that each of the sunshade panels is cooperatively opened and closed. Upon opening the sunshade panels, a rear-side sunshade panel is lifted up so that a front-side sunshade panel positioned in front of this rear-side sunshade panel moves under and is superposed below the rear-side sunshade panel.

13 Claims, 16 Drawing Sheets

FIG.5A
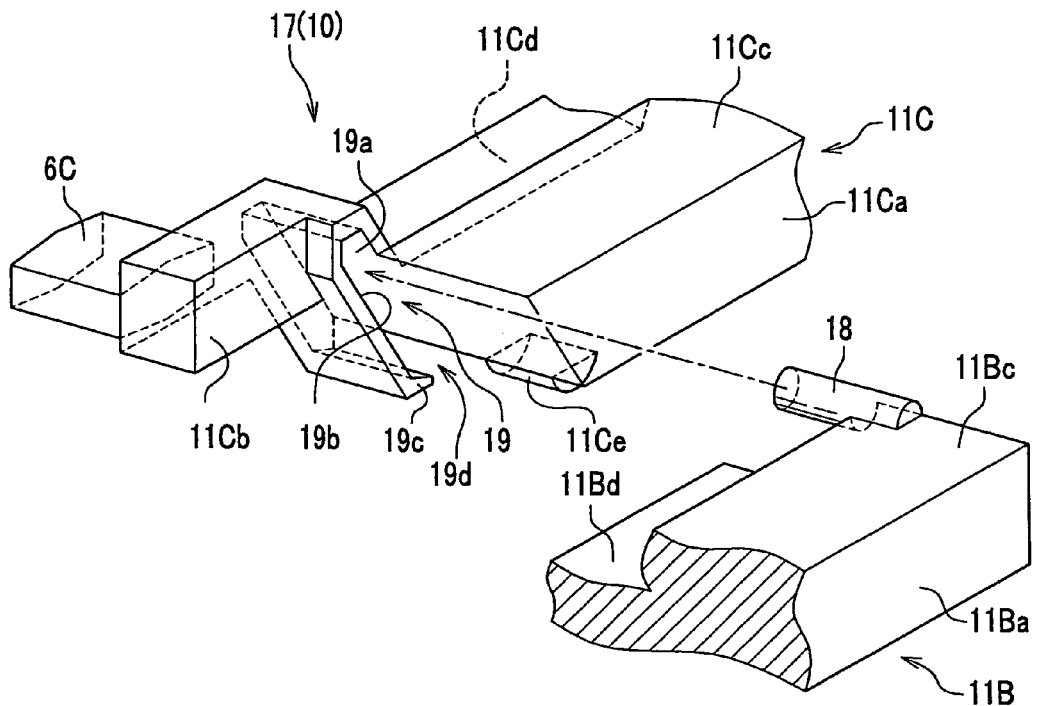
FIG.5B
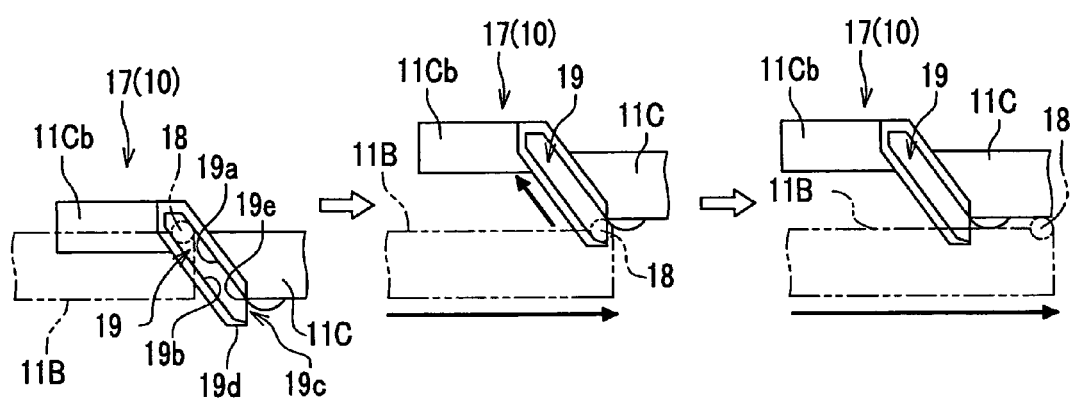
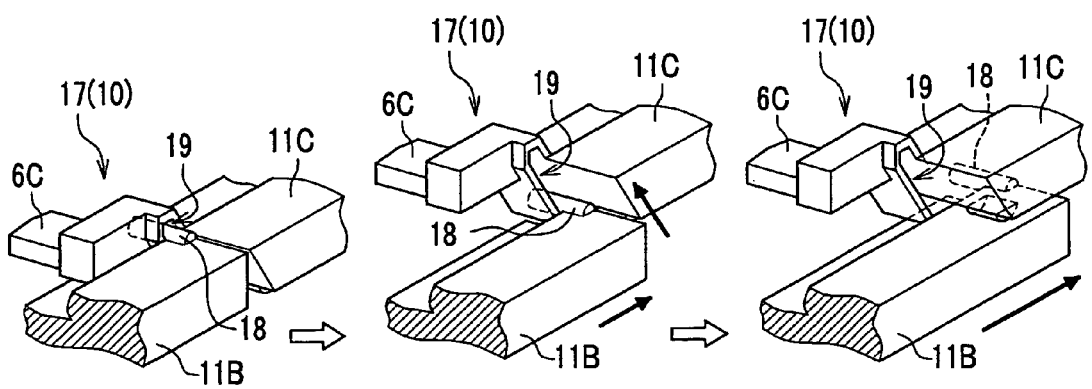

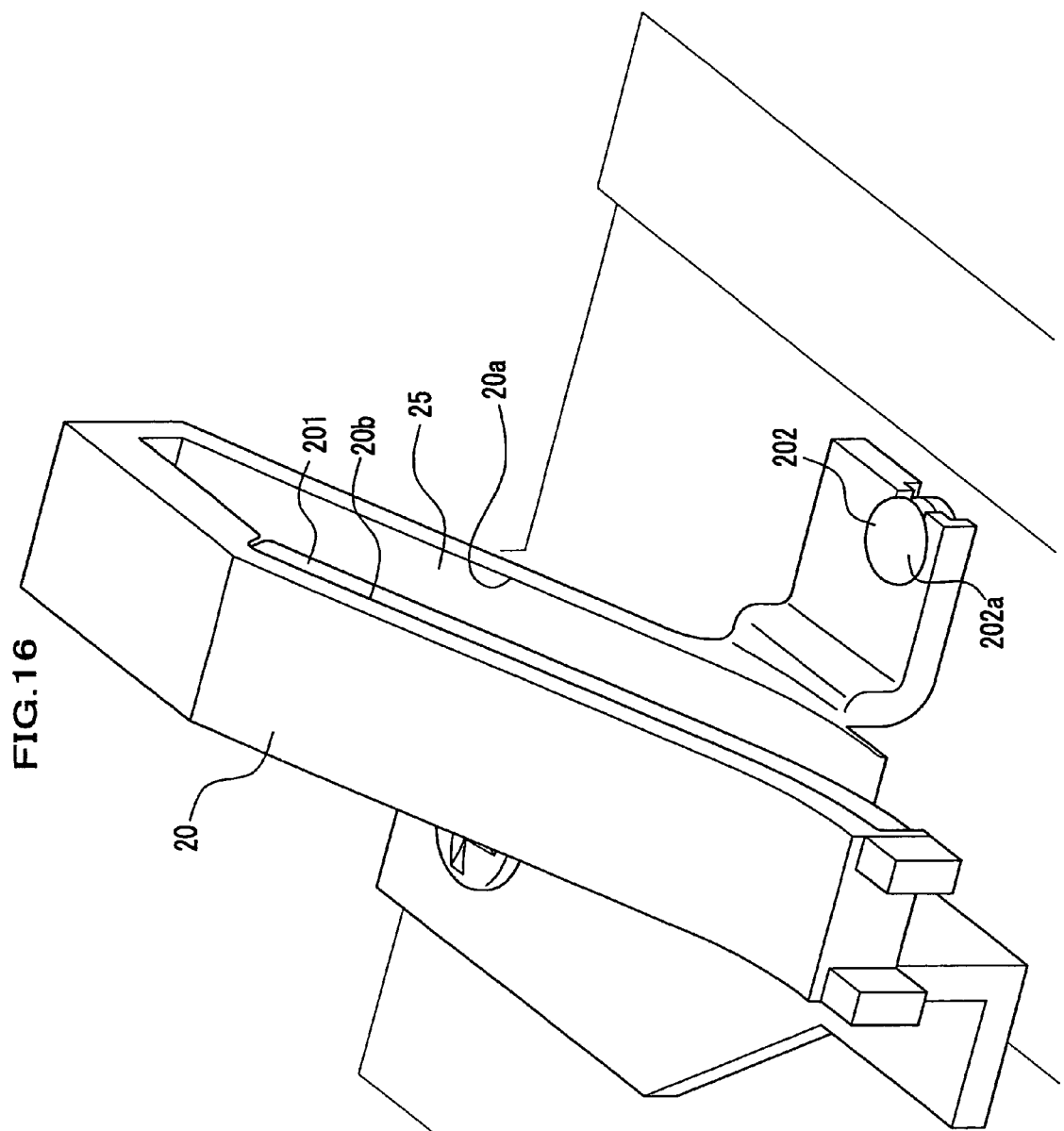

INTERFERENCE BETWEEN ADJACENT SUNSHADE PANELS

SUNSHADE DEVICE FOR VEHICLE

CROSS REFERENCE TO RELATED APPLICATIONS

This application claims the foreign priority benefit under Title 35, United States Code, §119(a)-(d) of Japanese Patent Applications No. 2005-374843 filed on Dec. 27, 2005, No. 2006-057445 filed on Mar. 3, 2006, No. 2006-179881 filed on Jun. 29, 2006, No. 2006-184451 filed on Jul. 4, 2006, and No. 2006-272599 filed on Oct. 4, 2006 in the Japan Patent Office, the disclosures of which are herein incorporated by reference in their entirety.

BACKGROUND OF THE INVENTION

The present invention relates to a sunshade device which is mounted in an inner opening of a vehicular roof.

A sunshade device is known, for example, by Japanese Patent No. 3115646. This sunshade device comprises: a plurality of sunshade panels mounted to be freely opened/closed in an inner opening of a roof of a vehicle along the longitudinal direction of the vehicle so that in a closed state they are arranged in line along the longitudinal direction of the vehicle; front and rear sliders provided in the side surfaces of each sunshade panel; guide rails for guiding the linear sliding movement of the front and rear sliders; a drive source connected to the forefront sunshade panel; and a connecting mechanism for detachably connecting adjacent two sunshade panels. The sunshade panels are stacked one on top of another at the rear part of the guide rails.

In this Japanese Patent No. 3115646, an engagement portion provided on a front-side sunshade panel and a guide portion urge downward a pressed-down guide portion formed on a rear-side sunshade panel, to thereby superpose and retract the front-side sunshade panel on top of the rear-side sunshade panel.

Japanese Laid-open Patent Application No. 8-118959 also discloses a mechanism for stacking a plurality of sunshade panels one on top of another. Referring to the figures of this application, a front-side guide shaft 29 and a rear-side guide shaft 30 provided on a rear slide sunshade 18 are slid down to a front-side branch 40 and a rear-side branch 41, respectively, extending diagonally and downward from the guide rail 38, so that the rear slide sunshade 18 is positioned in a lower position.

Further, Japanese Laid-open Patent Application No. 11-348567 also discloses a similar guide link mechanism in a slide lifter-type roof structure for vehicles. This slide lifter-type roof structure includes slide covers corresponding to the sunshade panels, and a guide pin corresponding to the guide shaft, which passes through a guide slit corresponding to the guide rail.

On the contrary to the above construction disclosed in Japanese Patent No. 3115646 wherein the rear-side sunshade panel is pressed down and retracted, another construction may be proposed to lift up the rear-side sunshade panel while the front-side sunshade panel is positioned and superposed below the rear-side sunshade panel. Such a construction is advantageous because the height space between the guide rails and the roof outside panel of the vehicle can be used as a retracting space for sunshade panels so that the height of the interior space at the rear side of the cabin can be assured as large as possible.

The present invention seeks to provide a sunshade device for a vehicle, in which the rear-side sunshade panel is lifted up so that the front-side sunshade panel moves under the rear-side sunshade panel to thereby superpose and retract the rear-side sunshade panel on top of the front-side sunshade panel, and which is simple in structure and excels in reduction in manufacturing cost.

SUMMARY OF THE INVENTION

According to the present invention, there is provided a sunshade device for a vehicle comprising: a plurality of sunshade panels mounted in an inner opening of a vehicular roof along a longitudinal direction of the vehicle, the sunshade panels being arranged in line along the longitudinal direction of the vehicle in a closed state of the sunshade panels; a pair of front and rear sliders each provided at both side portions of each sunshade panel; a pair of guide rails for guiding a liner sliding movement of the front and rear sliders; a drive source connected to a forefront sunshade panel; and a connecting mechanism for detachably connecting adjacent sunshade panels such that each of the sunshade panels is cooperatively opened and closed. A sunshade panel positioned at a rear portion of the guide rails is lifted up so that a front-side sunshade panel positioned in front of this rear-side sunshade panel moves under and is superposed below the rear-side sunshade panel. The adjacent sunshade panels have a cam mechanism including at least one cam pin formed on one sunshade panel, and at least one cam groove formed on the other sunshade panel corresponding to the cam pin and having one end thereof opened to guide the cam pin. The sunshade device further includes a pair of slanted rails provided at rear ends of the guide rails and extending in a diagonally upward and rearward direction, and a pair of front slider releasing parts positioned above the front sliders at a time when the rear sliders slide up along the slanted rails to a predetermined position. When the sunshade panels are opened, the rear sliders of the rear-side sunshade panel are elevated to the predetermined position along the pair of slanted rails, and thereafter by a movement of the cam pin within the corresponding cam groove, the front sliders are elevated through the front slider releasing parts with the rear sliders as a center of rotation. The cam pin comes off from the end of the corresponding cam groove, and the front-side sunshade panel moves rearward and is positioned below the rear-side sunshade panel.

With this construction, it is possible to provide a sunshade device for a vehicle, in which the rear-side sunshade panel is lifted up so that the front-side sunshade panel moves under the rear-side sunshade panel to thereby superpose and retract the rear-side sunshade panel on top of the front-side sunshade panel, and which is simple in structure and excels in reduction in manufacturing cost.

The aforementioned sunshade device may further comprise a pair of deviation prevention walls which guide with the slanted rails the rear-side sunshade panel in the longitudinal direction of the vehicle at a time when the rear-side sunshade panel is positioned in a retracted position and which prevent a deviation of the rear-side sunshade panel in the longitudinal direction of the vehicle.

With this construction of the sunshade device, it is possible to effectively prevent a backlash of the sunshade panel when the panel is lifted up and is in the retracted position. This can improve the quality of the sunshade device.

In the aforementioned sunshade device, the cam pin may be formed on the front-side sunshade panel and the cam groove may be formed on the rear-side sunshade panel. Further, the cam groove may extend in a diagonally downward and rearward direction with its lower end opened and comprise a slanted upper cam surface and a slanted lower cam surface. A lower end of the slanted lower cam surface is positioned below a lower end of the slanted upper cam surface such that when the sunshade panels are closed, the cam pin that is left disengaged and linearly moves in a forward direction is guided in and engaged with the corresponding cam groove.

With this construction of the sunshade device, an engagement operation of the sunshade panels can be performed smoothly when the sunshade panels are closed.

In the aforementioned sunshade device, the rear slider may comprise a first sliding surface in contact with a bottom surface of the guide rail, and a second sliding surface in contact with a bottom surface of the slanted rail. The sunshade device may be provided with a spring mechanism which abuts on an upper surface of the guide rail or an upper surface of the slanted rail and presses by a reaction force received therefrom the first sliding surface and the second sliding surface against the bottom surface of the guide rail and the bottom surface of the slanted rail, respectively.

With this construction of the sunshade device, when each rear slider is positioned in the corresponding guide rail, the first sliding surface of the rear slider is pressed against the bottom surface of the guide rail, whereas when the rear slider is positioned in the corresponding slanted rail, the second sliding surface of the rear slider is pressed against the bottom surface of the slanted rail. Notwithstanding that a surface-contacting portion of the rear slider is changed relative to the rail (guide rail; slanted rail) during the sliding movement of the rear slider, the rear slider can always and stably surface contact the rail (guide rail; slanted rail). This can decrease an occurrence of backlash. Further, the single spring mechanism functions to press the first sliding surface against the bottom surface of the guide rail and to press the second sliding surface against the bottom surface of the slanted rail, which can simplify the structure of the rear slider.

In the aforementioned sunshade device, the spring mechanism may be mounted on the rear slider, and the spring mechanism may comprise a pressing member which abuts on the upper surface of the guide rail or the upper surface of the slanted rail, and a plate spring which is made of metal and placed between the pressing member and the rear slider.

With this construction of the sunshade device, the plate spring of the spring mechanism is made of metal so that the durability of the spring mechanism can be improved. Since the plate spring can be easily processed, it is possible to reduce the manufacturing cost.

In the aforementioned sunshade device, the front sliders of the rear-side sunshade panel may be arranged, as viewed from side, at positions on a front end of the rear-side sunshade panel or ahead of the front end of the rear-side sunshade panel.

With this construction of the sunshade device, when the sunshade panels are opened, the front end of the rear-side sunshade panel moves in a direction away from the rear end of the front-side sunshade panel. Therefore, interference between the rear end of the front-side sunshade panel and the front end of the rear-side sunshade panel can be prevented. When the sunshade panels are closed and the rear-side sunshade panel moves with the rear end thereof rotated downward, the front end of the rear-side sunshade panel is positioned higher than the rear end of the front-side sunshade panel. From that position of the rear-side sunshade panel, the front end of the rear-side sunshade panel moves downward with the front sliders as an instantaneous center. This can prevent interference between the rear end of the front-side sunshade panel and the front end of the rear-side sunshade panel. Herein, the wording "the front sliders of the rear-side sunshade panel are arranged, as viewed from side, at a position on a front end of the rear-side sunshade panel" indicates a state in which at least the front sliders partly overlap the front end portion of the rear-side sunshade panel as viewed from side.

The aforementioned sunshade device may further comprise a first buffer member which is provided at least on a part of a sliding groove formed in the slanted rail and which absorbs a backlash of the rear slider, and a second buffer member which absorbs an impact to be applied at a time when the rear slider moves from the slanted rail to the guide rail.

With this construction of the sunshade device, when each rear slider moves along the guide rail and the slanted rail, the first buffer member and the second buffer member contact the rear slider to restrict noises derived from vibration due to backlash of the rear slider, and a slapping sound or an impact due to the structure for switching over the sliding surfaces of the slider. Therefore, it is possible to alleviate discomfort of passengers.

In the aforementioned sunshade device, each of the first buffer member and the second buffer member may be a discrete member from the slanted rail.

With this construction of the sunshade device, since the first buffer member and the second buffer member are discrete members from the slanted rail, they can be manufactured from various materials, allowing the width of selection of the materials to be extended.

In the aforementioned sunshade device, a supporting bracket may be attached on both side portions of each sunshade panel to form the front and rear sliders. The cam pin may be formed on the front-side sunshade panel at a rear end of the supporting bracket, and the cam groove may be formed on the rear-side sunshade panel at a front end of the bracket. Further, the sunshade device may further comprise a mechanism which returns the cam pin to a normal sliding locus, if adjacent sunshade panels are come off from each other and the cam pin deviates from the normal sliding locus, as a result that the sunshade panels are opened and the front-side sunshade panel presses the rear-side sunshade panel rearward at rear end portions of the supporting brackets attached to the front-side sunshade panel, and that the front and rear sliders of the rear-side sunshade panel are released from a vertical movement restriction by the guide rails at a predetermined position of the rear-side sunshade panel, and further that the front-side sunshade panel lifts up the rear-side sunshade panel.

With this construction of the sunshade device, even if the front-side sunshade panel and the rear-side sunshade panel come off from each other, when the sunshade panels are opened, the front-side sunshade panel presses the rear-side sunshade panel rearward at rear end portions of the supporting brackets attached to the front-side sunshade panel and lifts up the rear-side sunshade panel, so that the cam pin can be retuned to the normal sliding locus. By the further closing movement of the sunshade panels, the engagement between the front-side sunshade panel and the rear-side sunshade panel can be recovered. Therefore, even if the sunshade panels are disengaged, the engagement relation of the sunshade panels can be automatically recovered without requiring a repair by the maker.

Further, the aforementioned sunshade device may further comprise a mechanism for preventing a contact between a rear end of the front-side sunshade panel and a front end of the rear-side sunshade panel, so that at a time when the rear end portions of the supporting brackets of the front-side sunshade panel contact with front end portions of the supporting brackets of the rear-side sunshade panel, the rear end of the front-side sunshade panel and the front end of the rear-side sunshade panel are not come in contact with each other, and at a time when the rear end portions of the supporting brackets of the front-side sunshade panel lifts up the front end portions of the supporting brackets of the rear-side sunshade panel, the front end portions of the rear-side sunshade panel are lifted up to prevent a contact with the front-side sunshade panel.

With this construction of the sunshade device, a contact between the front end of the rear-side sunshade panel and the rear end of the front-side sunshade panel can be prevented, thereby preserving the quality of the sunshade panels over an extended period of time.

Other features and advantages of the present invention will be apparent from the following description.

BRIEF DESCRIPTION OF THE DRAWINGS

The aspects of the present invention will become more apparent by, describing in detail illustrative, non-limiting embodiments thereof with reference to the accompanying drawings, in which:

FIGS. 5A and 5B are explanatory views illustrating a cam mechanism in detail;

FIG. 16 is an enlarged perspective view of the structure around the slanted rail according to the second modification;

DESCRIPTION OF THE PREFERRED EMBODIMENTS

A sunshade device according to the present invention will be described below. In the following description, the sunshade device is equipped with three sunshade panels.

Figure 1:
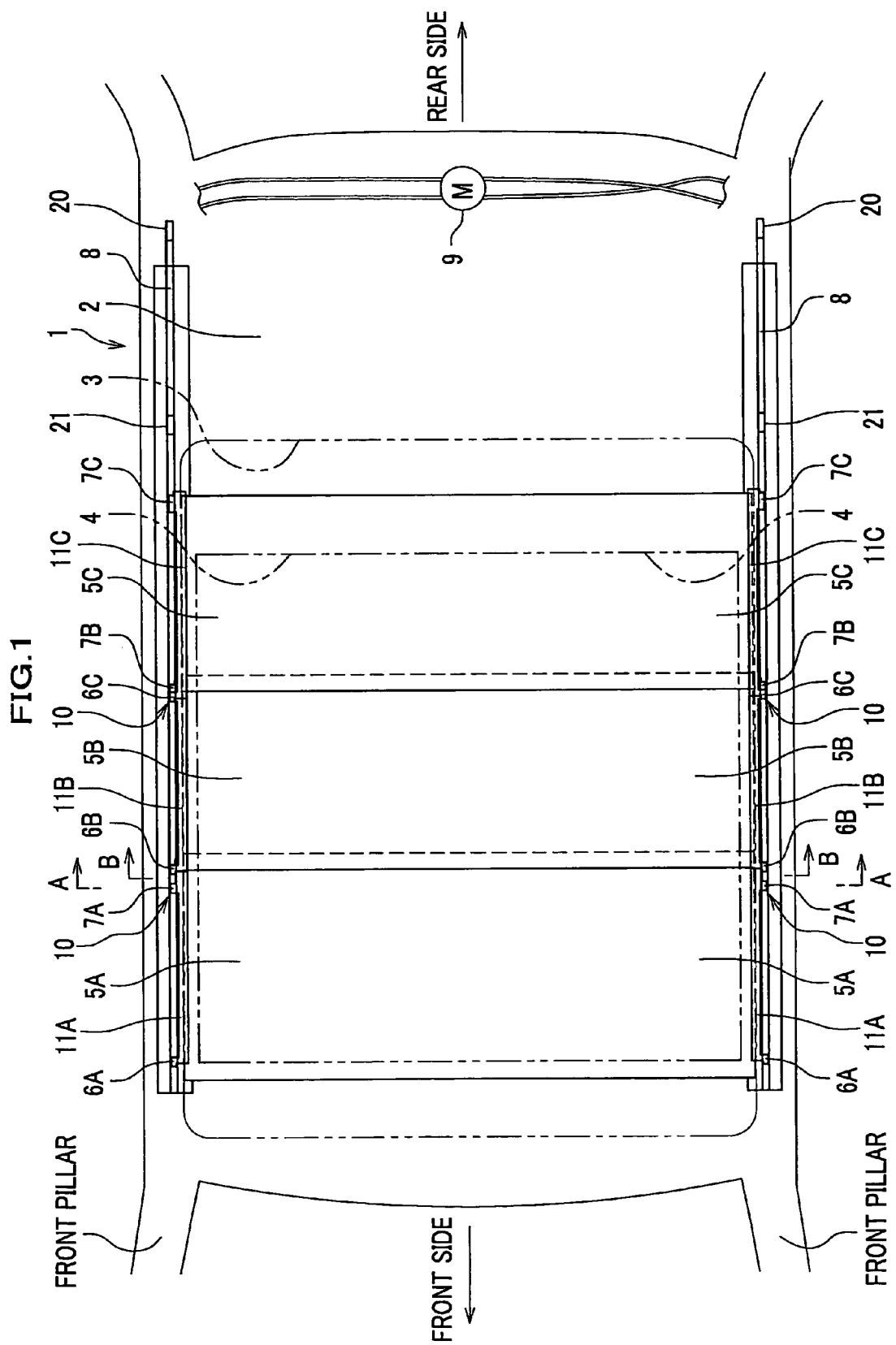
FIG. 1 is a top plan view of a sunshade device according to the present invention.

Referring to FIG. 1, a rectangular-shaped glass panel 3 as shown in phantom is attached to a vehicular roof outer panel 2. Other than this type in which the glass panel 3 is fixed to the roof outer panel 2, the glass panel 3 may be of a movable type such as a tilt-type and a slide-type.

Figure 2:
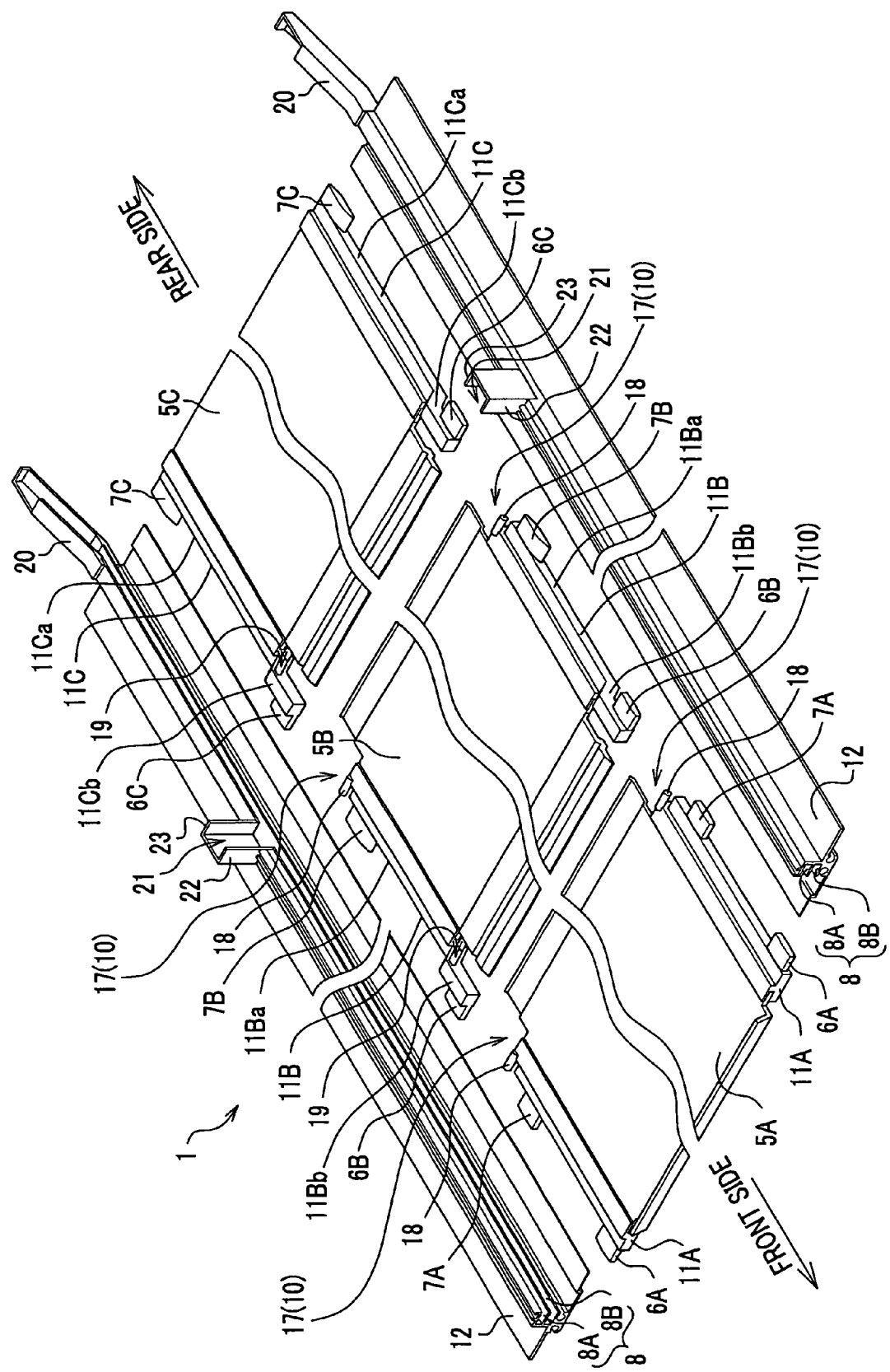
FIG. 2 is an exploded perspective view partly illustrating the sunshade device.

A sunshade device 1 is provided inside the ceiling of the vehicle cabin to take in or shut off the sun light from the glass panel 3. The sunshade device 1 is mounted to an inner opening 4 of the roof in such a manner to be freely opened/closed in the longitudinal (front-rear) direction of the vehicle. As seen in FIG. 2, the sunshade device 1 includes a plurality of sunshade panels 5A-5C which are arranged in line along the longitudinal direction of the vehicle in a closed state of the sunshade panels 5A-5C, a pair of front sliders 6A-6C and rear sliders 7A-7C each provided at both side portions of each sunshade panel 5A-5C, a pair of guide rails 8, 8 for guiding a liner sliding movement of the front sliders 6A-6C and the rear sliders 7A-7C, a drive source 9 (FIG. 1) connected to the forefront sunshade panel 5A, a connecting mechanism 10 for detachably connecting adjacent sunshade panels (i.e., sunshade panels 5A and 5B, and sunshade panels 5B and 5C) such that each of the sunshade panels 5A-5C is cooperatively opened and closed.

Since the sunshade device 1 is substantially symmetrical about the longitudinal axis passing through the center of the vehicle, only one side of the sunshade device 1 will be described in the following descriptions.

Figure 3:
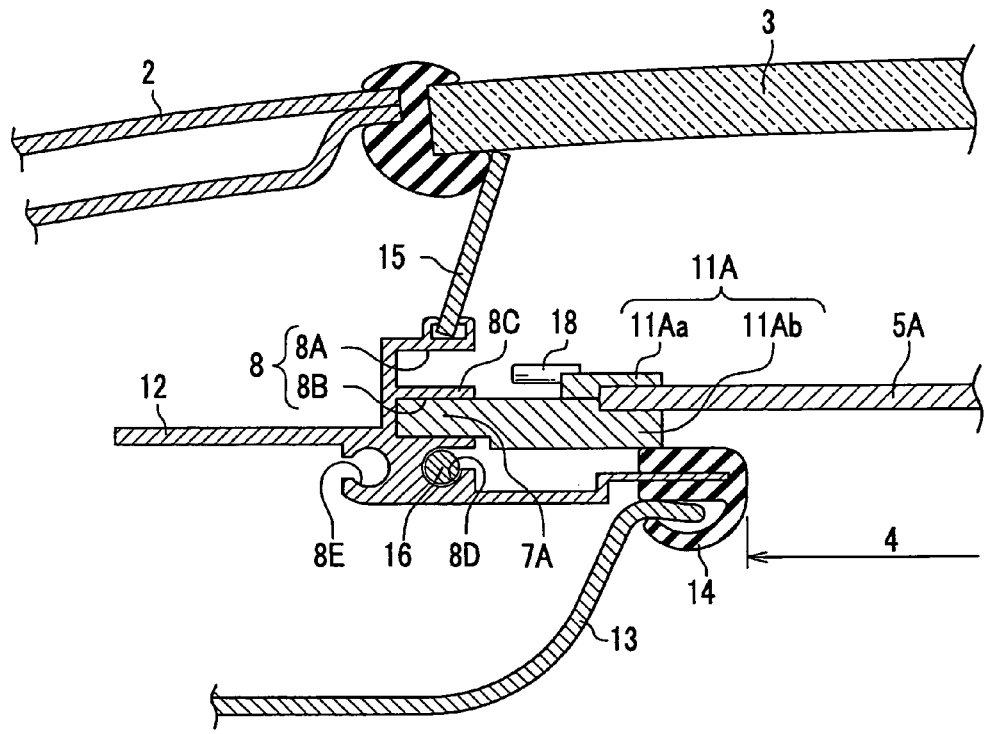
FIG. 3 is a sectional view taken along the line A-A of FIG. 1.
Figure 4:
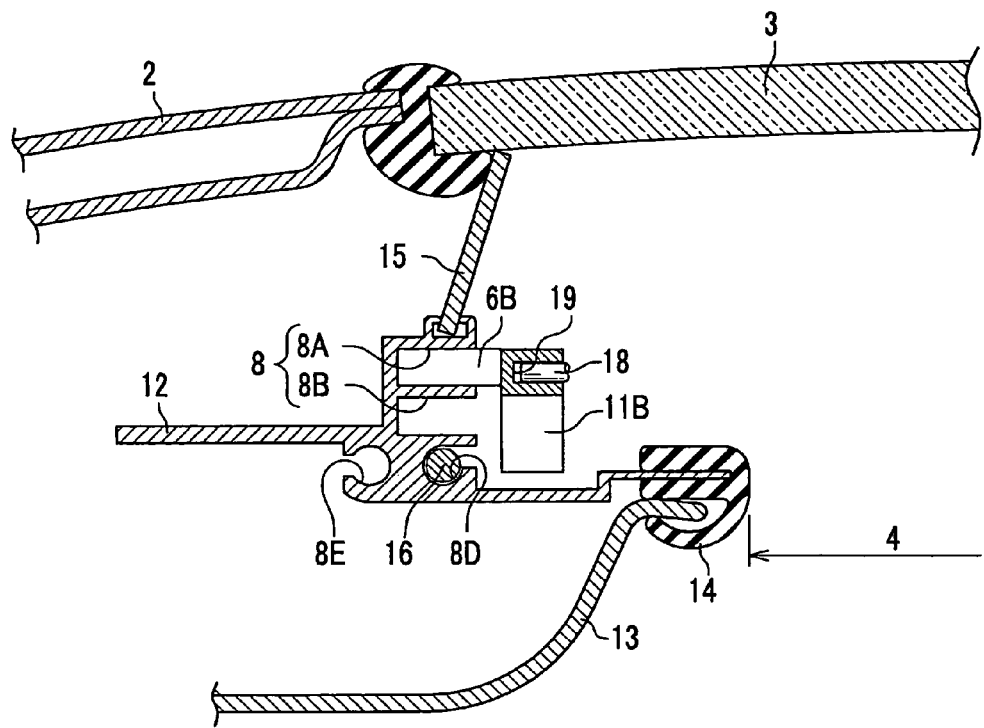
FIG. 4 is a sectional view taken along the line B-B of FIG. 1.

The sunshade panels 5A-5C are each provided at one side portion thereof with a supporting bracket 11A-11C which extends along the longitudinal direction of the vehicle. Each supporting bracket 11A-11C is attached, for example, as shown in FIG. 3. Namely, the supporting bracket 11A is divided into upper and lower brackets 11Aa, 11Ab, and the side edge portion of the sunshade panel 5A is sandwiched by these upper and lower brackets 11Aa, 11Ab and fixed by fastening means (not shown). The supporting brackets 11A-11C (FIG. 1) are made of plastic, etc.

As shown in FIG. 2, the front sliders 6A-6C and the rear sliders 7A-7C are provided on the supporting brackets 11A-11C, respectively, in the width direction of the vehicle. The sunshade panels 5A-5C slide in the front and rear (longitudinal) directions of the vehicle with the front sliders 6A-6C and rear sliders 7A-7C guided in the right and left guide rails 8, 8. The linear sliding movement of the front and rear sliders 6A-6C, 7A-7C allows the sunshade panels 5A-5C to be opened and closed in the longitudinal directions.

A description will be given of a guide frame 12 which forms the guide rail 8. The guide frame 12 has a predetermined sectional shape and extends in the longitudinal direction of the vehicle. The guide frame 12 is made, for instance, by extrusion molding aluminum alloy. As shown in FIG. 3, the guide frame 12 is positioned above the interior ceiling board 13 arranged around the inner opening 4 of the roof. One end of the guide frame 12 in the width direction of the vehicle is inserted into and fixed to a trim member 14 which is attached to the edge portion of the interior ceiling board 13, and the other end of the guide frame 12 is fixed to the vehicular frame (not shown). Each of the supporting brackets 11A-11C (FIG. 2) moves along the longitudinal directions of the vehicle with a part thereof placed on the trim member 14.

The guide rail 8 is formed in the guide frame 12. The guide rail 8 opens inward in the width direction of the vehicle. In this preferred embodiment, the guide rail 8 includes an upper rail 8A and a lower rail 8B which are arranged one on top of another to form a two-leveled structure. The upper rail 8A and the lower rail 8B are partitioned by a horizontal partition plate member 8C so that each of the upper and lower rails 8A, 8B forms a rectangular sectional space which opens inward in the width direction of the vehicle. In the structure shown in FIG. 2, the rear sliders 7A-7C are guided by the lower rail 8B, and except for the forefront sunshade panel 5A, at least the front sliders 6B, 6C provided on the sunshade panels 5B, 5C are guided by the upper rail 8A. For this reason, each of the supporting brackets 11B, 11C is formed such that the front end portion 11Bb, 11Cb is joined to the main body portion 11Ba, 11Ca through the slanted portion and positioned higher than the main body portion 11Ba, 11Ca. Each front slider 6B, 6C is provided on the side surface of the front end portion 11Bb, 11Cb. The front slider 6A of the sunshade panel 5A is guided by the lower rail 8B. However, the front slider 6A may be guided by the upper rail 8A.

As seen in FIG. 3, a screening member 15 is attached between the upper surface of the guide frame 12 and the glass panel 3. Provided below the lower rail 8B of the guide frame 12 are cable grooves 8D, 8E each for inserting therethrough a push-pull cable 16. The push-pull cable 16 is operated in a push-pull manner by the drive source 9 (electric motor) shown in FIG. 1. One end of the push-pull cable 16 is connected to the supporting bracket 11A of the sunshade panel 5A. The cable groove 8D is a drive passage groove for inserting a front end side of the push-pull cable 16, whereas the cable groove 8E is an idle passage groove for inserting a tail end side of the push-pull cable 16 that is for the other guide frame 12.

With reference to FIG. 2, the connecting mechanism 10 will be described. The connecting mechanism consists of a cam mechanism 17. In the relations between the sunshade panel 5A and the sunshade panel 5B and between the sunshade panel 5B and the sunshade panel 5C, the cam mechanism 17 includes a cam pin 18 formed on one sunshade panel, and a cam groove 19 formed on the other sunshade panel corresponding to the cam pin 18 and having one end thereof opened to guide the cam pin 18 for engagement with and disengagement from the cam groove 19.

In the following description, the cam mechanism 17 particularly connecting the sunshade panel 5B and the sunshade panel 5C will be explained. In this preferred embodiment, the cam pin 18 is provided on the front-side sunshade panel 5B, and the cam groove 19 is provided on the rear-side sunshade panel 5C. As shown in FIG. 5A, the main body portion 11Ba of the supporting bracket 11B has stepped upper surfaces in the width direction of the vehicle such that a first upper surface 11Bc that is positioned inward is higher than a second upper surface 11Bd that is positioned outward. Provided in the proximity of the rear end of the first upper surface 11Bc is a cam pin 18 which protrudes horizontally and outward in the width direction of the vehicle. In order to prevent the cam pin 18 from interfering with the structure around the cam groove 19 of the supporting bracket 11C, the rear end of the second upper surface 11Bd of the supporting bracket 11B is cut out.

The main body portion 11Ca of the supporting bracket 11C also has a stepped upper surface in the width direction of the vehicle such that a first upper surface 11Cc that is positioned inward is higher than a second upper surface 11Cd that is positioned outward. As previously described, the front end portion 11Cb is joined to the main body portion 11Ca through the slanted portion and positioned higher than the main body portion 11Ca. The supporting bracket 11C is diagonally cut at the front ends of the first and second upper surfaces 11Cc, 11Cd to provide a slanted surface. The front end portion 11Cb is provided only at a front part of the second upper surface 11Cd. Facing to this slanted surface, a cam groove 19 is formed in the side surface of the slanted portion at a position inward in the width direction of the vehicle.

As shown in FIG. 5B, the cam groove 19 has a slanted upper cam surface 19a and a slanted lower cam surface 19b, and extends in a diagonally rearward direction. At the lower end of the cam groove 19 is formed an opening 19c. As described later on the operation of the sunshade device 1, the lower end 19d of the slanted lower cam surface 19b is positioned below the lower end 19e of the slanted upper cam surface 19a such that when the sunshade panels 5A-5C (FIG. 1) are closed, the cam pin 18 that is left disengaged and linearly moves in a forward direction is guided in and engaged with the cam groove 19e. Therefore, the opening 19c is opened substantially in the rearward direction. A semi-cylindrical slide-contact portion 11Ce is provided at the front end of the bottom surface of the main body portion 11Ca, so as to slide contact with the first upper surface 11Bc of the supporting bracket 11B during the sliding movement of the sunshade panel 5B relative to the sunshade panel 5C.

The sunshade panels 5A-5B as shown in FIG. 1 also have a cam mechanism which is identical to the above cam mechanism 17, and detailed description thereof will be omitted.

As seen in FIG. 2, a slanted rail 20 extending in a diagonally upward and rearward direction is provided at the rear end of the lower rail 8B. Further, a front slider releasing part 21 is formed in a position above the front sliders 6C, 6B at a time when the rear sliders 7C, 7B of the sunshade panels 5C, 5B slide up along the slanted rail 20 to a predetermined position. The front slider releasing part 21 is formed by an upper space extending at the rear end part of the upper rail 8A. A deviation prevention wall 22 is provided around the front slider releasing part 21. The deviation prevention wall 22 guides with the slanted rail 20 the rear-side sunshade panel (sunshade panel 5C; sunshade panel 5B) in the longitudinal direction of the vehicle at a time when the rear-side sunshade panel 5C, 5B is positioned in a retracted position, and prevents a deviation of the rear-side sunshade panel 5C, 5B in the longitudinal direction of the vehicle.

Figure 6:
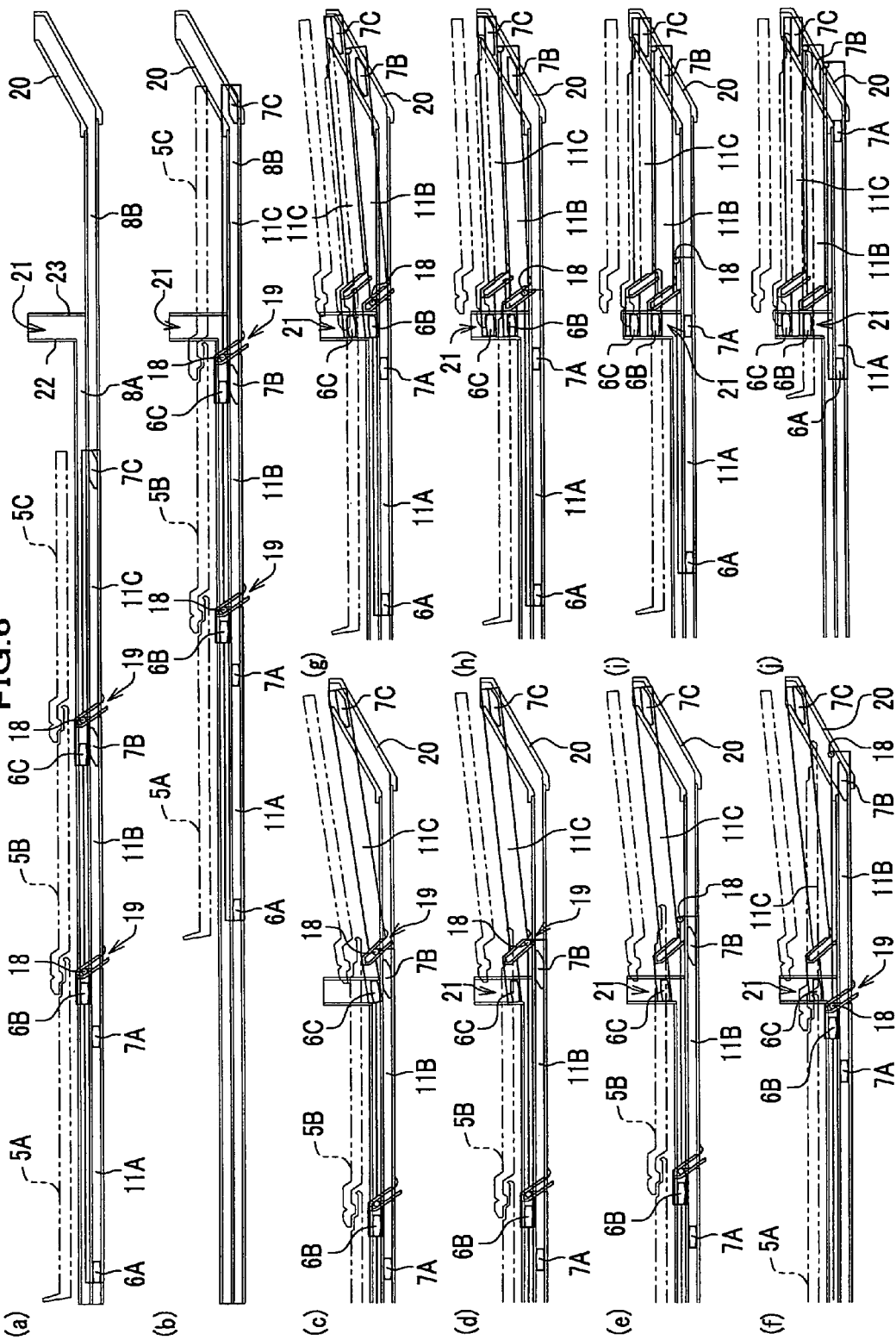
FIG. 6 explains an operation of the sunshade device as seen from the side.

Operation of the sunshade device 1 according to the present invention will be described with reference to FIG. 6. Since the vehicular roof is slightly curved upward in the width direction of the vehicle, the sunshade panels 5A-5C are also slightly curved upward in conformity with the vehicular roof shape. Positions of the sunshade panels 5A-5C as shown by phantom lines in FIG. 6 correspond to the height position of the sunshade panels 5A-5C taken along the line extending across the center in the width direction of the vehicle.

FIG. 6(a) shows a state in which the sunshade panels 5A-5C are fully closed. Each cam pin 18 is positioned in the corresponding cam groove 19 near the upper end of the cam groove 19. The front end of the sunshade panel 5B is positioned on the rear end of the sunshade panel 5A to an extent that would not apply an unreasonable force. Similarly, the front end of the sunshade panel 5C is positioned on the rear end of the sunshade panel 5B to an extent that would not apply an unreasonable force. The bottom surfaces of the respective sunshade panels 5A-5C lie flush with each other.

When the drive source 9 (FIG. 1) actuates from the state shown in FIG. 6(a), the sunshade panel 5A slides rearward through the front slider 6A and the rear slider 7A by the pulling operation of the push-pull cable 16 (FIG. 1), during which the cam pin 18 of the sunshade panel 5A presses the sunshade panel 5B at the slanted upper cam surface 19a of the cam groove 19 (FIG. 5). The front slider 6A and the rear slider 7A of the sunshade panel 5A are guided by the lower rail 8B, and the front slider 6B and the rear slider 7B of the sunshade panel 5B are guided by the upper rail 8A and the lower rail 8B, respectively. Therefore, a relative displacement between the cam pin 18 and the cam groove 19 does not occur in the vertical direction, and the pressing force applied by the cam pin 18 acts as a force which makes the sunshade panel 5B slide in the rearward direction. In a similar manner, the sunshade panel 5C slides rearward. As a result, the sunshade panels 5A-5C slide together in the rearward direction.

Figure 7:
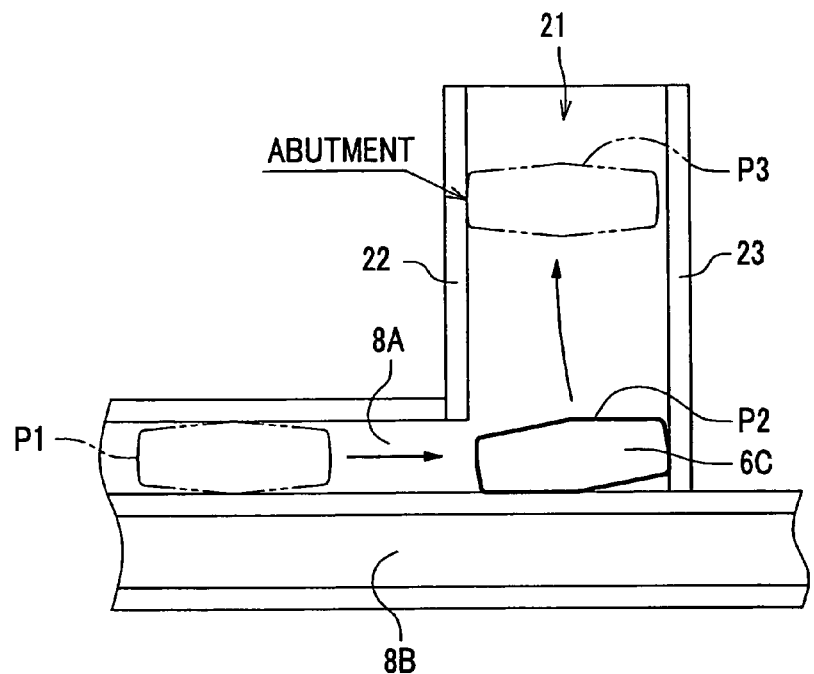
FIG. 7 is an enlarged view illustrating a structure around the rear end of an upper rail.
Figure 8:
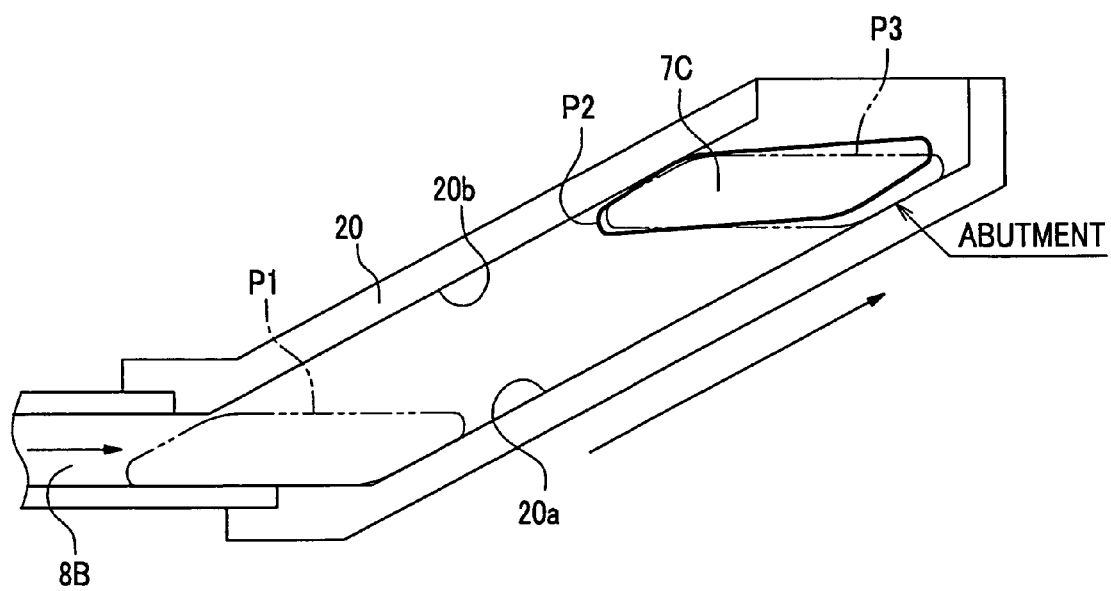
FIG. 8 is an enlarged view illustrating a structure around a slanted rail.

FIG. 6(b) shows a state in which the rear slider 7C of the sunshade panel 5C reaches the rear end position of the lower rail 8B. From this state, as shown in FIG. 6(c), the rear slider 7C slides up along the slanted rail 20. Sliding up movement of the sunshade panel 5C will be described in detail with reference to FIGS. 7 and 8. In FIG. 7, the reference numeral P1 indicates the position in which the front slider 6C is in the position as shown in FIG. 6(b). In FIG. 8, the reference numeral P1 indicates the position in which the rear slider 7C is in the position as shown in FIG. 6(b). Further, the reference numerals P2 shown in FIGS. 7 and 8 respectively indicate the position of the front slider 6C and the position of the rear slider 7C as shown in FIG. 6(c). In the process of the movement from the position P1 to the position P2, as seen in FIG. 7, the front slider 6C is guided by the upper rail 8A to restrict the vertical displacement of the front slider 6C. Therefore, the rear slider 7C shown in FIG. 8 slides up along the slanted rail 20 while slightly rotating in the counterclockwise direction with the front slider 6C that slides rearward under the restriction of the vertical displacement as an instantaneous center.

The front slider 6C per se also moves rearward while slightly rotating in the counterclockwise direction. For this reason, the front slider 6C has a shape such that the center part, as seen in the longitudinal direction of the vehicle, has the maximum height and the upper surfaces slant downward from the center part in the front and rear directions whereas the lower surfaces slant upward from the center part in the front and rear directions. If the front slider 6C is relatively rotatable with respect to the supporting bracket 11C (FIG. 6) and an urging means such as a spring member for position recovery is employed, the front slider 6C may be rectangular in the side cross section. In the process of movement from FIG. 6(b) to 6(c), the cam groove 19 moves upward relative to the cam pin 18.

As seen in FIG. 7, the front slider 6C contacts the stopper wall 23 when the rear slider 7C is positioned in the position P2 of FIG. 8. This position P2 (see FIG. 8) corresponds to the predetermined position defined in the claims, above which the sliding movement of the rear slider 7C is not allowed. In this position of the rear slider 7C, as seen in FIG. 7, the front slider releasing part 21 is positioned above the front slider 6C that is in the position P2. Therefore, the cam groove 19 moves upward by the pressing force from the cam pin 18, and the front slider 6C that has been released from the restriction of the upward movement rotates in the clockwise direction with the rear slider 7C as the rotation center and moves up through the front slider releasing part 21. See FIG. 6(d). The stopper wall 23 may be provided in the slanted rail 20. The distance between the deviation prevention wall 22 and the stopper wall 23 is sufficient for allowing the front slider 6C to rotate in the clockwise direction.

As seen in FIG. 6(e), the sunshade panel 5B and the sunshade panel 5C are disengaged when the cam pin 18 comes off from the cam groove 19 that moves upward. The cam pin 18 comes from the cam groove 19 while pressing the bottom surface of the supporting bracket 11C in the upward direction, which can prevent a backlash upon disengagement of the sunshade panels 5B and 5C.

When the supporting bracket 11B slides further in the backward direction from the state shown in FIG. 6(e), as shown in the right-hand side of FIG. 5B, the slide-contact portion 11Ce formed on the bottom surface of the supporting bracket 11C slide contacts with the first upper surface 11Bc of the supporting bracket 11B. The lower end 19d of the slanted lower cam surface 19b is positioned above the second upper surface 18d of the supporting bracket 11B that is lower than the first upper surface 11Bc, which can prevent an interference therebetween.

As seen in FIG. 6(f), after the rear slider 7B of the sunshade panel 5B reaches the rear end position of the lower rail 8B, as with the operation of the sunshade panel 5C, the rear slider 7B slides up along the slanted rail 20 by the pressing force applied by the cam pin 18 of the sunshade panel 5A. Since the front slider 6B contacts the stopper wall 23 shown in FIG. 7, the sliding movement of the rear slider 7B can be restricted. This position corresponds to the predetermined position defined in the claims, above which the rear slider 7B of the sunshade panel 5B cannot slide up along the slanted rail 20.

In this position of the rear slider 7B, the front slider releasing part 21 is positioned above the front slider 6B. Therefore, the cam groove 19 of the sunshade panel 5B moves upward by the pressing force from the cam pin 18 of the sunshade panel 5A, and the front slider 6B rotates in the clockwise direction with rear slider 7B as the rotation center and moves up through the front slider releasing part 21. See FIG. 6(h).

As seen in FIG. 6(i), the sunshade panel 5A and the sunshade panel 5B are disengaged when the cam pin 18 comes off from the cam groove 19 that moves upward. In this state, the upper surface of the supporting bracket 11A presses the supporting bracket 11B in the upward direction, and the upper surface of the supporting bracket 11B presses the supporting bracket 11C in the upward direction. Therefore, the sunshade panels 5B, 5C are retracted such that they are substantially horizontally positioned and superposed one on top of another. In this position, each front end portion of the front sliders 6C, 6B abuts on the deviation prevention wall 22. This position is shown by the reference numeral P3 in FIGS. 7 and 8, respectively. The reference numeral P3 in FIG. 7 indicates the position of the front slider 6C, and the reference numeral P3 in FIG. 8 indicates the position of the rear slider 7C. In other words, taking into account the sunshade panel 5C, a deviation of the sunshade panel 5C can be prevented in the longitudinal direction of the vehicle because the rear end surface of the rear slider 7C abuts on the bottom surface 20a of the slanted rail 20 and the front end surface of the front slider 6C abuts on the deviation prevention wall 22. For the same reason as above, a deviation of the sunshade panel 5B can also be prevented in the longitudinal direction of the vehicle.

As seen in FIG. 6(j), when the supporting bracket 11A slides in the backward direction to the predetermined rear end position, the closing operation of the sunshade panels 5A-5C is completed. The sunshade panel 5B moves under and is superposed below the sunshade panel 5C with a certain space, and the sunshade panel 5A is superposed below the sunshade panel 5B with a certain space. Since the supporting bracket 11A is stopped with it pulled by the push-pull cable 16, it is possible to prevent a deviation of the sunshade panel 5A in the longitudinal direction of the vehicle. Further, in order to prevent a backlash of the retracted sunshade panels 5C, 5B in the vertical directions, it is preferable, when necessary, to provide an urging means for pressing the sunshade panel 5C from above.

Next, the closing operation of the sunshade panels 5A-5C will be briefly described. When the supporting bracket 11A slides in the forward direction from the state shown in FIG. 6(j), the cam pin 18 of the sunshade panel 5A contacts the cam groove 19 of the sunshade panel 5B at around the lower end 19d of the slanted lower cam surface 19b (FIG. 5B) and is guided into the cam groove 19. When the supporting bracket 11A slides further in the forward direction, the cam pin 18 makes the cam groove 19 lower to thereby lowering the front slider 6B of the supporting bracket 11B. The rest of the operation is substantially reversed from the opening operation, and the description thereof will be omitted.

As described above, the connecting mechanism 10 for detachably connecting adjacent sunshade panels includes the cam pin 18 formed on one sunshade panel, and the cam groove 19 formed on the other sunshade panel and having one end thereof opened to guide the cam pin 18. Further, the sunshade device 1 includes the slanted rail 20 provided at the rear end of the guide rail 8 and extending in the diagonally upward and rearward direction, and the front slider releasing part 21 positioned above the front sliders 6C, 6B at a time when the rear sliders 7C, 7B slide up along the slanted rail 20 to the predetermined position. When the sunshade panels 5A-5C are opened, taking into account the rear-side sunshade panel 5C (5B), the rear slider 7C (7B) are elevated to the predetermined position along the slanted rail 20, and thereafter by the movement of the cam pin 18 within the corresponding cam groove 19, the front slider 6C (6B) is elevated through the front slider releasing part 21 with the rear slider 7C (7B) as the rotation center, so that the cam pin 18 comes off from the end of the corresponding cam groove 19, and the front-side sunshade panel 5B (5A) moves rearward and is positioned below the rear-side sunshade panel 5C (5B). With this construction of the sunshade device 1, it is possible to provide the sunshade device 1, in which the rear-side sunshade panel 5C (5B) is lifted up so that the front-side sunshade panel 5B (5A) moves under the rear-side sunshade panel 5C (5B) to thereby superpose and retract the rear-side sunshade panel 5C (5B) on top of the front-side sunshade panel 5B (5A), and which is simple in structure and excels in reduction in manufacturing cost.

In this preferred embodiment, the guide rail 8 includes the upper rail 8A and the lower rail 8B which are arranged one on top of another to form a two-leveled structure, and the rear sliders 7A-7C are guided by the lower rail 8B whereas except for the forefront sunshade panel 5A, at least the front sliders 6B, 6C provided on the sunshade panels 5B, 5C are guided by the upper rail 8A. Further, the front slider releasing part 21 is formed by the upper space extending at the rear end part of the upper rail 8A. Therefore, it is possible to readily design the layouts around the front sliders 6B, 6C, the rear sliders 7A-7C, and the cam mechanism 17, leading to the sunshade device 1 with a more simple structure.

In this preferred embodiment, the sunshade device 1 further includes the deviation prevention wall 22 which guides with the slanted rail 20 the rear-side sunshade panel 5C, 5B in the longitudinal direction of the vehicle at a time when the rear-side sunshade panel 5C, 5B is positioned in the retracted position and which prevents a deviation of the rear-side sunshade panel 5C, 5B in the longitudinal direction of the vehicle. Therefore, it is possible to effectively prevent a backlash of the retracted sunshade panels 5C, 5B.

In this preferred embodiment, the cam mechanism 17 includes the cam pin 18 formed on the front-side sunshade panel 5B (5A), and the cam groove 19 formed on the rear-side sunshade panel 5C (5B). Further, the cam groove 19 extends in the diagonally downward and rearward direction with its lower end opened and comprises the slanted upper cam surface 19a and the slanted lower cam surface 19b. Moreover, the lower end 19d of the slanted lower cam surface 19b is positioned below the lower end of the slanted upper cam surface 19a such that when the sunshade panels 5A-5C are closed, the cam pin 18 that is left disengaged and linearly moves in the forward direction is guided in and engaged with the corresponding cam groove 19. Therefore, the engagement between the sunshade panels 5A, 5B and the engagement between the sunshade panels 5B, 5C can be performed smoothly when the sunshade panels 5A-5C are closed.

Figure 9:
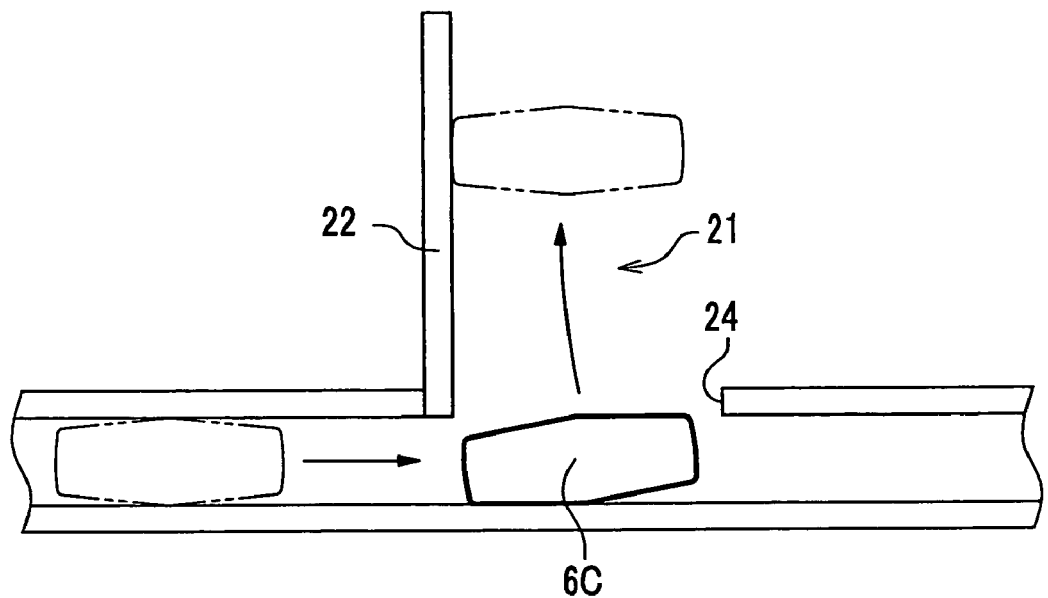
FIG. 9 is an explanatory view of a front slider releasing part formed in a guide rail, in which the guide rail is single-leveled and the upper part of the guide rail is partly cut to provide the front slider releasing part.

One preferred embodiment of the present invention has been described above. In the above preferred embodiment, the guide rail 8 forms a two-leveled structure having the upper and lower rails 8A, 8B. However, the guide rail 8 may be of a single-leveled structure so that all the front sliders 6A-6C and the rear sliders 7A-7C are guided in this single-leveled guide rail 8. In this modified embodiment, as shown in FIG. 9, in order to provide the front slider releasing part 21, an intermediate portion of the single-leveled guide rail 8 is cut at the upper part thereof to provide a cutout 24. For instance, the front slider 6C is elevated trough the cutout 24 and at the front slider releasing part 21, and thereafter the front slider 6C abuts on the deviation prevention wall 22.

Figure 10:
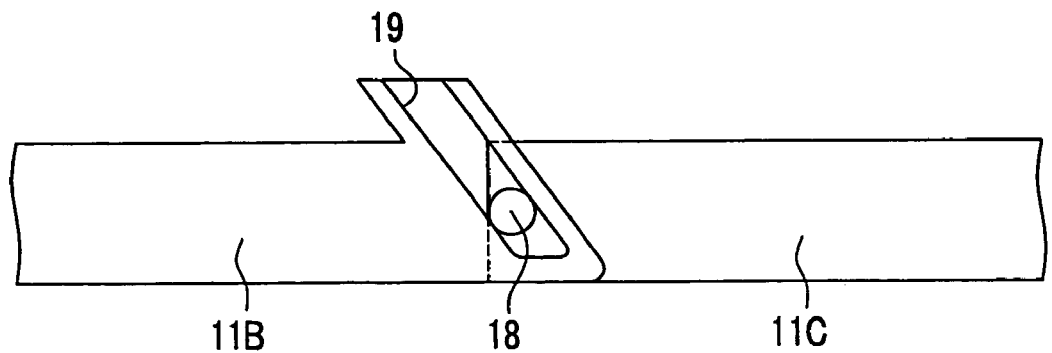
FIG. 10 shows a modified embodiment of the cam mechanism, in which the cam groove is formed on the front-side sunshade panel and the cam pin is formed on the rear-side sunshade panel.

Further, in the above preferred embodiment, the cam pin 18 is formed on the front-side sunshade panel and the cam groove 19 is formed on the rear-side sunshade panel. However, as shown in FIG. 10, the front-side sunshade panel 11B may have the cam groove 19 whereas the rear-side sunshade panel 11C may have the cam pin 18. In this modified embodiment, although the cam groove 19 extends in the diagonally downward and rearward direction as with the above embodiment, the opening for engagement/disengagement of the cam pin 18 with/from the cam groove 19 is provided at the upper end of the cam groove 19.

First Modification

According to the first modification, the rear slider comprises a first sliding surface in contact with a bottom surface of the guide rail, and a second sliding surface in contact with a bottom surface of the slanted rail. Further, the sunshade device is provided with a spring mechanism which abuts on an upper surface of the guide rail or an upper surface of the slanted rail and presses by a reaction force received therefrom the first sliding surface and the second sliding surface against the bottom surface of the guide rail and the bottom surface of the slanted rail, respectively. Moreover, the spring mechanism is mounted on the rear slider, and the spring mechanism comprises a pressing member which abuts on the upper surface of the guide rail or the upper surface of the slanted rail, and a plate spring which is made of metal and placed between the pressing member and the rear slider.

Figure 11:
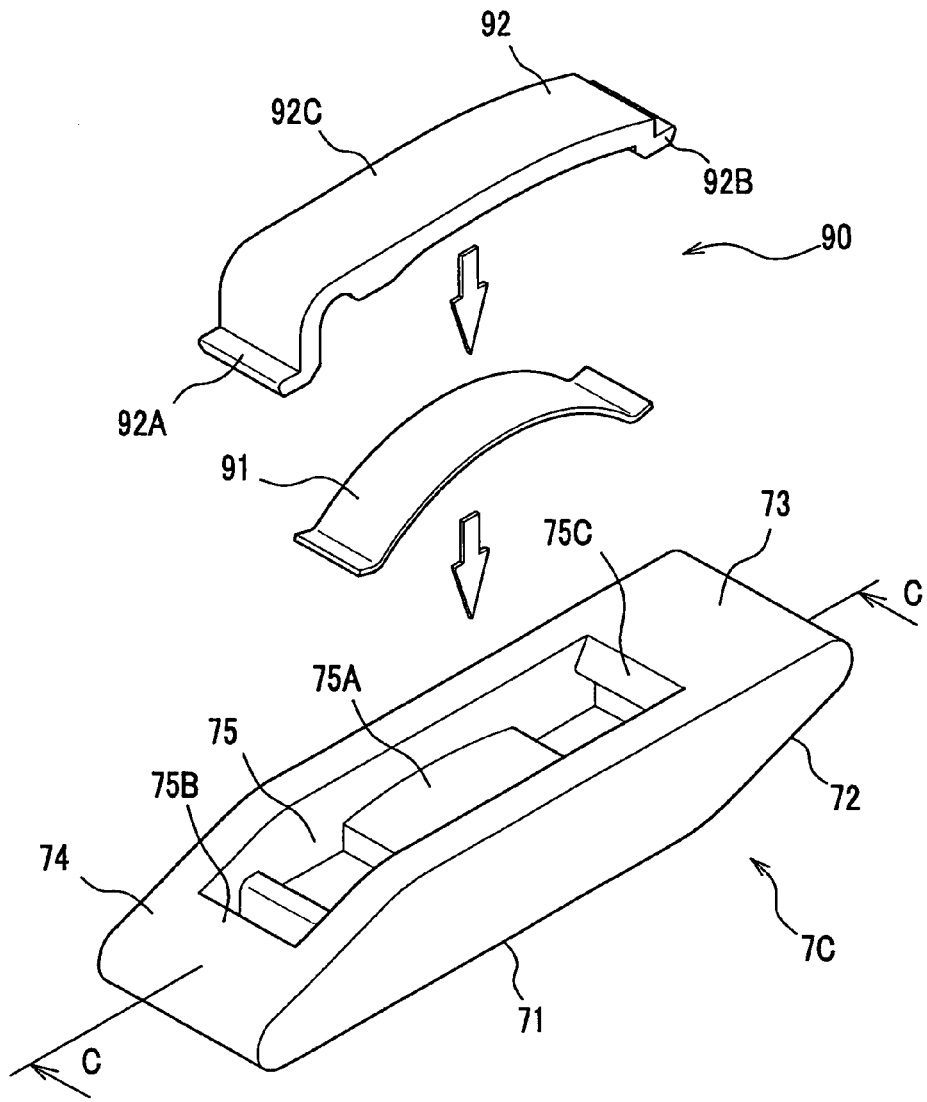
FIG. 11 is an exploded perspective view of a spring mechanism according to a first modification.
Figure 12:
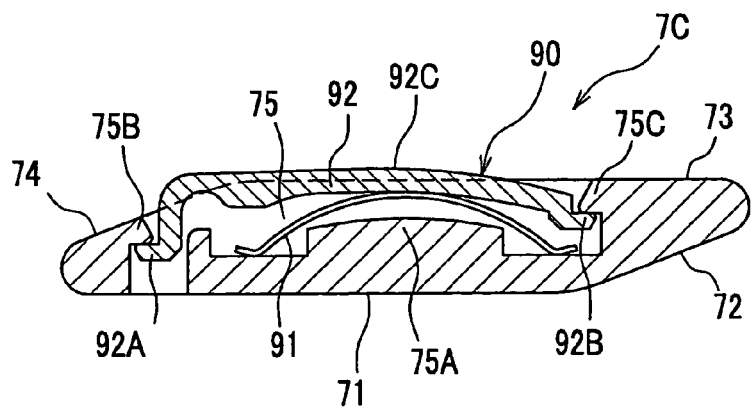
FIG. 12 is a sectional view taken along the line C-C of FIG. 11 with the spring mechanism mounted on the rear slider.
Figure 13:
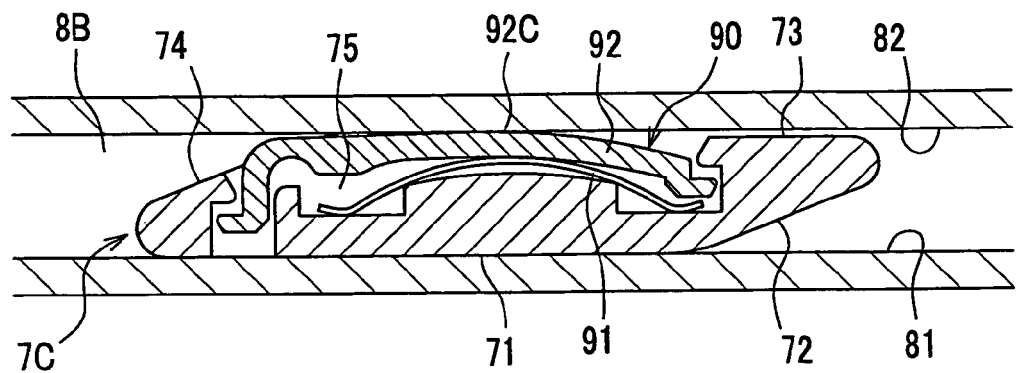
FIG. 13 is an explanatory view of the first modification, illustrating the rear slider positioned in the lower rail.

The first modification is adapted to the rear sliders 7C, 7B which slide along the slanted rail 20. In the following description, only the rear slider 7C will be described. FIG. 11 is an exploded perspective view of the rear slider 7C and a spring mechanism 90 to be mounted to the rear slider 7C. FIG. 12 is a sectional view taken along the line C-C of FIG. 11 with the spring mechanism 90 mounted on the rear slider 7C. FIGS. 13 and 14 are explanatory views, illustrating the rear slider 7C positioned in the lower rail 8B, and the rear slider 7C positioned in the slanted rail 20, respectively.

With reference to FIGS. 11 to 14, the rear slider 7C is made of plastic. The rear slider 7C is substantially parallelogramic in cross section. The lower surface 71 of the rear slider 7C surface contacts the bottom surface 81 of the lower rail 8B, and the rear slanted surface 72 surface contacts the bottom surface 20a of the slanted rail 20. The lower surface 71 of the rear slider 7C corresponds to the first sliding surface defined in the claims, and the rear slanted surface 72 of the rear slider 7C corresponds to the second sliding surface defined in the claims. The upper surface 73 of the rear slider 7C faces to the upper surface 82 of the lower rail 8B, and the front slanted surface 74 of the rear slider 7C faces to the upper surface 20b of the slanted rail 20.

Formed in the upper surface 73 and the front slanted surface 74 of the rear slider is a recessed groove 75 having a rectangular profile as seen from the top. The recessed groove 75 extends in the longitudinal direction of the rear slider 7C, and the spring mechanisms 90 to be described later is fitted into the recessed groove 75.

The spring mechanism 90 consists of a plate spring 91 which is made of metal and is curved upward, and a pressing member 92 which is made of plastic and is a plate-like member whose profile as seen from the top is substantially the same as that of the upper opening of the recessed groove 75. The plate spring 91 is placed on the bottom surface of the recessed groove 75, and the pressing member 92 is arranged and superposed on the upper surface of the plate spring 91.

Provided at a center of the bottom surface of the recessed groove 75 is a raised portion 75A which protrudes and seats below the curved portion of the plate spring 91, so that a deviation of the plate spring 91 can be prevented by the raised portion 75A. A front engagement portion 75B and a rear engagement portion 75C are provided in the recessed groove 75 so as to prevent the pressing member 92 from comeing off from the rear slider 7C in the upward direction. To be more specific, the front engagement portion 75B is formed at the front end portion of the recessed groove 75 and the rear engagement portion 75C is formed at the rear end portion of the recessed groove 75 so that the front end portion 92A of the pressing member 92 is hooked against the front engagement portion 75B and the rear end portion 92B of the pressing member 92 is hooked against the rear engagement portion 75C.

As described above, the spring mechanism 90 consists of the pressing member 92, and the plate spring 91 placed between the pressing member 92 and the rear slider 7C, and in a state shown in FIG. 12 in which the rear slider 7C is not guided by the lower rail 8B or the slanted rail 20, the upper surface 92C of the pressing member 92 that has been urged upward by the spring-back action of the plate spring 91 protrudes from the upper surface 73 and the front slanted surface 74 of the rear slider 7C. The upper surface 92C of the pressing member 92 abuts on the upper surface 82 of the lower rail 8B or the upper surface 20b of the slanted rail 20.

Next, the operation of the rear slider 7C according to this first modification will be described. During the opening/closing operation of the sunshade panels 5A-5C (FIG. 1), the rear slider 7C positioned in the lower rail 8B moves as shown in FIG. 13, in a manner such that the lower surface 71 of the rear slider 7C surface contacts the bottom surface 81 of the lower rail 8B and the upper surface 92C of the pressing member 92 abuts on the upper surface 82 of the lower rail 8B. The pressing member 92 is urged upward by the plate spring 91, so that a spring-back force is imparted from the pressing member 92 to the upper surface 82 of the lower rail 8B. Therefore, a reaction force is applied from the upper surface 82 of the lower rail 8B to the rear slider 7C, so that the lower surface 71 of the rear slider 7C is pressed downward against the bottom surface 81 of the lower rail 8B. This makes it possible for the lower surface 71 of the rear slider 7C to stably surface contact the bottom surface 81 of the lower rail 8B. As a result, a backlash of the rear slider 7C can be prevented in the lower rail 8B.

Figure 14:
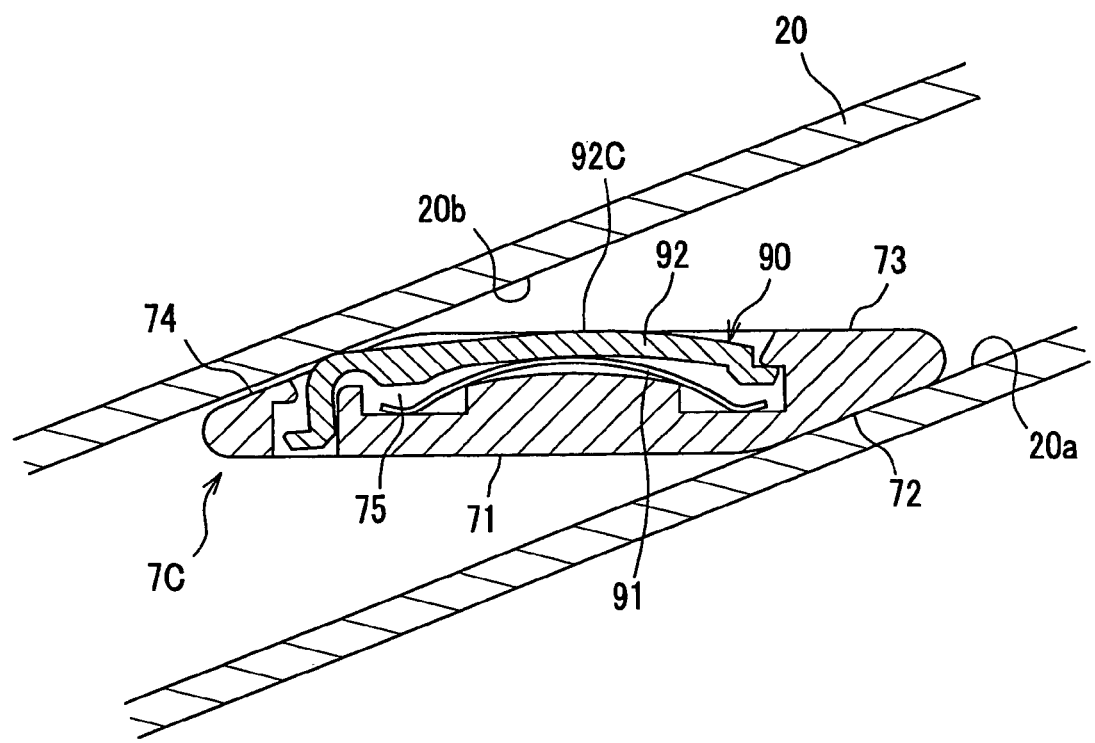
FIG. 14 is an explanatory view of the first modification, illustrating the rear slider positioned in the slanted rail.

As shown in FIG. 14, when the rear slider 7C slides up along the slanted rail 20 to the predetermined position, the rear slider 7C positioned in the slanted rail 20 moves in a manner such that the rear slanted surface 72 of the rear slider 7C surface contacts the bottom surface 20a of the slanted rail 20 and the front end portion of the upper surface 92C of the pressing member 92 abuts on the upper surface 20b of the slanted rail 20. For the same reason as with the rear slider 7C positioned in the lower rail 8B, a spring-back force is imparted from the pressing member 92 to the upper surface 20b of the slanted rail 20. Therefore, a reaction force is applied from the upper surface 20b of the slanted rail 20 to the rear slider 7C, so that the rear slanted surface 72 of the rear slider 7C is pressed against the bottom surface 20a of the slanted rail 20. This makes it possible for the rear slanted surface 72 of the rear slider 7C to stably surface contact the bottom surface 20a of the slanted rail 20. As a result, a backlash of the rear slider 7C can be prevented in the slanted rail 20.

As described above, providing the spring mechanism 90 makes it possible for the lower surface 71 of the rear slider 7C to be pressed against the bottom surface 81 of the lower rail 8B when the rear slider 7C is positioned in the lower rail 8B and for the rear slanted surface 72 of the rear slider 7C to be pressed against the bottom surface 20a of the slanted rail 20. Therefore, even if a surface contacting part of the rear slider 7C relative to the rail (guider rail 8; slanted rail 20) changes in the process of the sliding movement of the rear slider 7C, the rear slider 7C can always stably surface contact relative to the rails, which can prevent a backlash of the rear slider 7C.

The rear slider 7B of the sunshade panel 5B may have the same construction as the rear slider 7C. Although the sunshade device 1 according to the present invention is constructed such that surface contacting part of the rear slider 7B, 7C relative to the guide rail 8 and the slanted rail 20 changes in the process of the sliding movement of the rear slider 7B, 7C, a backlash of the rear slider 7B, 7C can be prevented, which leads to improvement on the quality of the sunshade panels 5A-5C.

The single spring mechanism 90 of the rear slider 7C has functions to urge and press the lower surface 71 of the rear slider 7C against the bottom surface 81 of the lower rail 8B and to urge and press the rear slanted surface 72 of the rear slider 7C against the bottom surface 20a of the slanted rail 20. Therefore, the structure of the rear slider 7C can be simplified.

Further, the plate spring 91 of the spring mechanism 90 is made of metal so that the durability of the spring mechanism 90 can be improved. Since the plate spring 91 can be easily processed, it is possible to reduce the manufacturing cost.

According to the first modification, the pressing member 92 is urged upward by the plate spring 91 as shown in FIG. 11. However, the resilient member for urging the pressing member 92 is not limited to the plate spring 91, and any known resilient member can be used with the pressing member 92. Further, as long as the pressing member 92 can be urged upward, the resilient member may not be arranged between the pressing member 92 and the rear slider 7C.

Second Modification

According to the second modification, the sunshade device further comprises a first buffer member which is provided at least on a part of a sliding groove formed in the slanted rail and which absorbs a backlash of the rear slider, and a second buffer member which absorbs an impact to be applied at a time when the rear slider moves from the slanted rail to the guide rail. Moreover, each of the first buffer member and the second buffer member is a discrete member from the slanted rail.

Figure 15:
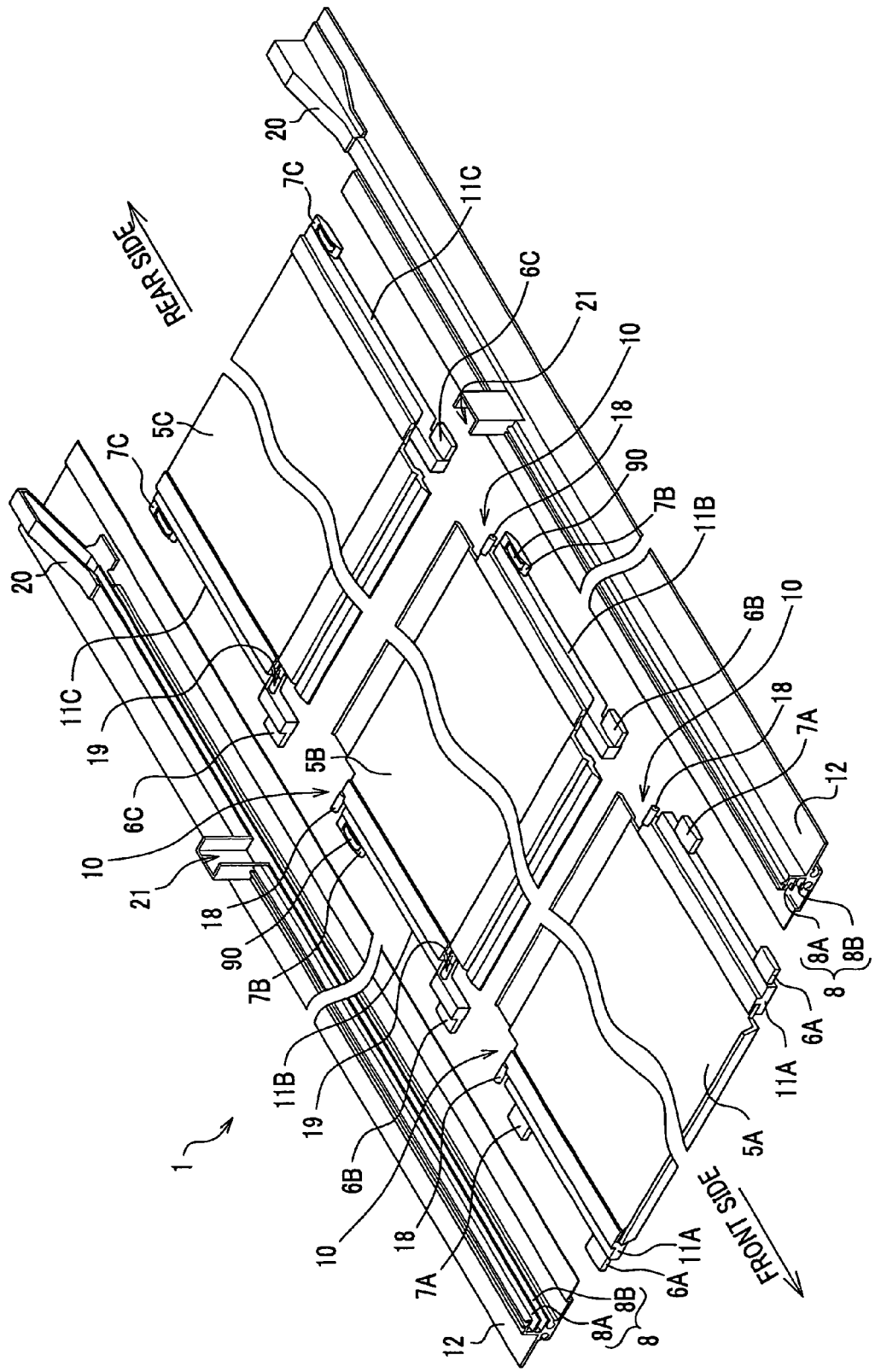
FIG. 15 is an exploded perspective view of a sunshade device according to a second modification.
Figure 17A:
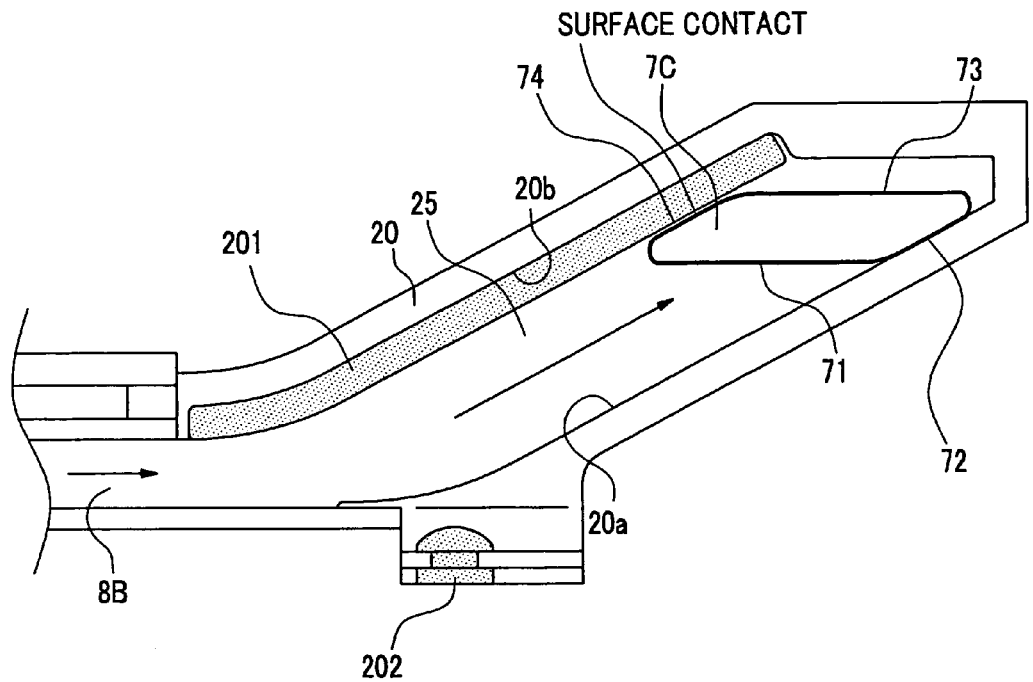
FIGS. 17A and 17B are explanatory views of the second modification, illustrating operations of the rear slider around the slanted rail as seen from the side.
Figure 17B:
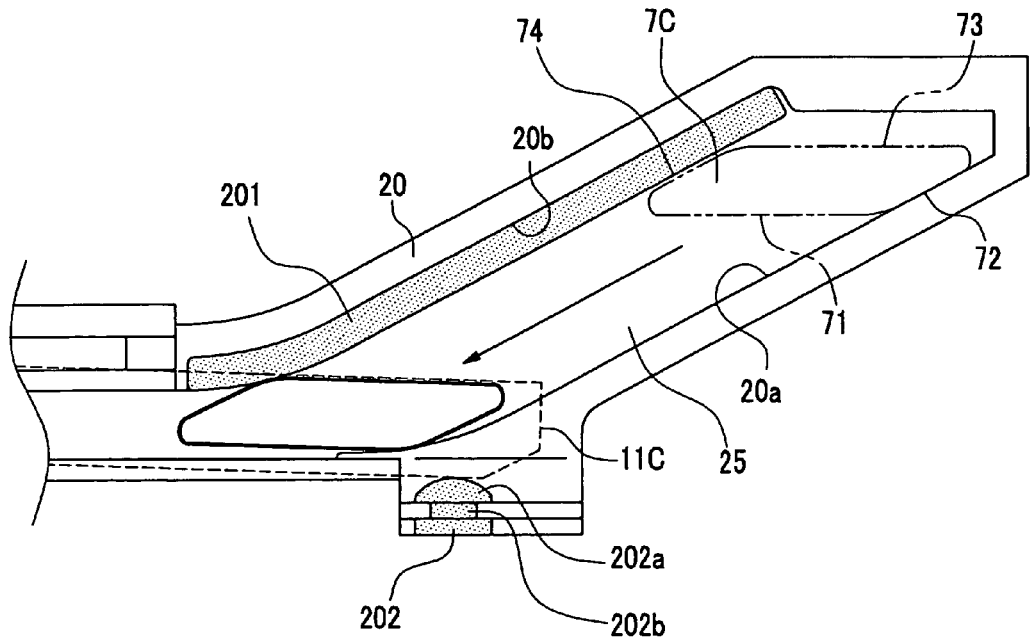

FIG. 15 is an exploded perspective view of a sunshade device according to the second modification. FIG. 15 is substantially the same as FIG. 2 except that the rear end of the guide frame 12 extends further in the rearward direction in accordance with the attachment structure of the slanted rail 20. FIG. 16 is an enlarged perspective view of the structure around the slanted rail, and FIGS. 17A and 17B are explanatory views of the second modification, illustrating operations of the rear slider around the slanted rail as seen from the side.

An upper buffer member 201 is provided in the slanted rail 20 in such a manner to cover the upper surface 20b of the sliding groove 25. Further, a lower buffer member 202 is provided at around the position where the bottom surface of the lower rail 8B and the bottom surface 20a of the slanted rail 20 are joined. The upper buffer member 201 corresponds to the first buffer member defined in the claims, and the lower buffer member 202 corresponds to the second buffer member defined in the claims.

The upper buffer member 201 is a plate-like member and is attached to the slanted rail 20 by elastic deformation. The buffer member 201 has projecting portions, and by press fitting the projecting portions into corresponding recesses formed in the upper surface 20b of the sliding groove 25, the upper buffer member 201 is attached to the slanted rail 20. However, the upper buffer member 201 may be fixed to the slanted rail 20 by any known member such as adhesive and bolts.

The lower buffer member 202 includes a semispherical portion 202a, and a stem portion 202b extending from the bottom surface of the semispherical portion 202a. The lower buffer member 202 is fixed by inserting the stem portion 202b into the corresponding hole formed in the attachment surface at the lower end part of the slanted rail 20.

As described above, since the upper buffer member 201 and the lower buffer member 202 are discrete members from the slanted rail 20, they can be manufactured from various materials, allowing the width of selection of the materials to be extended.

The upper buffer member 210 absorbs vibration due to backlash of the rear slider 7C, and is made of a material such as rubber, hard rubber, chloropropylene rubber, nitrile rubber, and resin (polyurethane).

Operation of the sunshade device according to the second modification will be described. FIG. 17A shows a state in which the rear slider 7C slides up from the lower rail 8B (guide rail 8) to the slanted rail 20 with its sliding surfaces changed, and FIG. 17B shows a state in which the rear slider 7C slides down along the slanted rail 20 and reaches the rear end of the lower rail 8B.

As seen in FIG. 17A, the rear slider 7C slides up from the rear end of the lower rail 8B along the slanted rail 20. As shown in FIG. 17A, the rear slider 7C slides up along the slanted rail 20 and stops in the predetermined position. In this position of the rear slider 7C, the rear slanted surface 72 of the rear slider 7C surface contacts the bottom surface 20a of the slanted rail 20 and the front slanted surface 74 abuts on the upper buffer member 201 fitted into the upper surface 20b of the slanted rail 20. Since the rear slider 7C abuts on the upper buffer member 201, it is possible to reduce vibration derived from the backlash of the rear slider 7C during the sliding movement of the rear slider 7C.

Next, with reference to FIG. 17B, a description will be given of a case in which the rear slider 7C slides down along the slanted rail 20. When the rear slider 7C slides down from the slanted rail 20 to the lower rail 8B (guide rail 8), that portion of the rear slider 7C which surface contacts the rail changes from the sliding surface 72 to the sliding surface 71 or from the sliding surface 74 to the sliding surface 73. Since the sliding surfaces of the rear slider 7C is switched over when the rear slider 7C passes the point where the lower rail 8B (guide rail 8) and the slanted rail 20 are joined, the bracket 11C that moves together with the rear slider 7C comes into contact with the lower rail 8B (guide rail 8). In this instance, the point of the lower rail 8B (guide rail 8) to which the bracket 11C firstly comes into contact is substantially constant in accordance with the structure of the guide rail. For this reason, the lower buffer member 202 (second buffer member) is arranged in this position.

As seen in FIGS. 16, 17A and 17B, the lower buffer member 202 is semispherical in shape at the point where the rear slider 7C comes into contact. Therefore, when the rear slider 7C slides up from the lower rail 8B to the slanted rail 20, switching the sliding surfaces of the rear slider 7C can be smoothly performed because of the shape and the elastic deformation of the lower buffer member 202. On the contrary, when the rear slider 7C slides down from the slanted rail 20 to the lower rail 8B, the bracket 11C reliably comes into contact with the lower buffer member 202 and the impact is absorbed, regardless of the tilt angle of the rear slider 7C. As long as the lower buffer member 202 can reduce the impact of the rear slider 7C, etc, the shape of the lower buffer member 202 is not limited to this specific shape. As described above, since the rear slider 7C comes into contact with the lower buffer member 202 when the rear slider 7C moves from the lower rail 8B to the slanted rail 20, it is possible to reduce noise derived from the switching of the sliding surfaces. Of course, the same can be said to the rear slider 7B.

Figure 18:
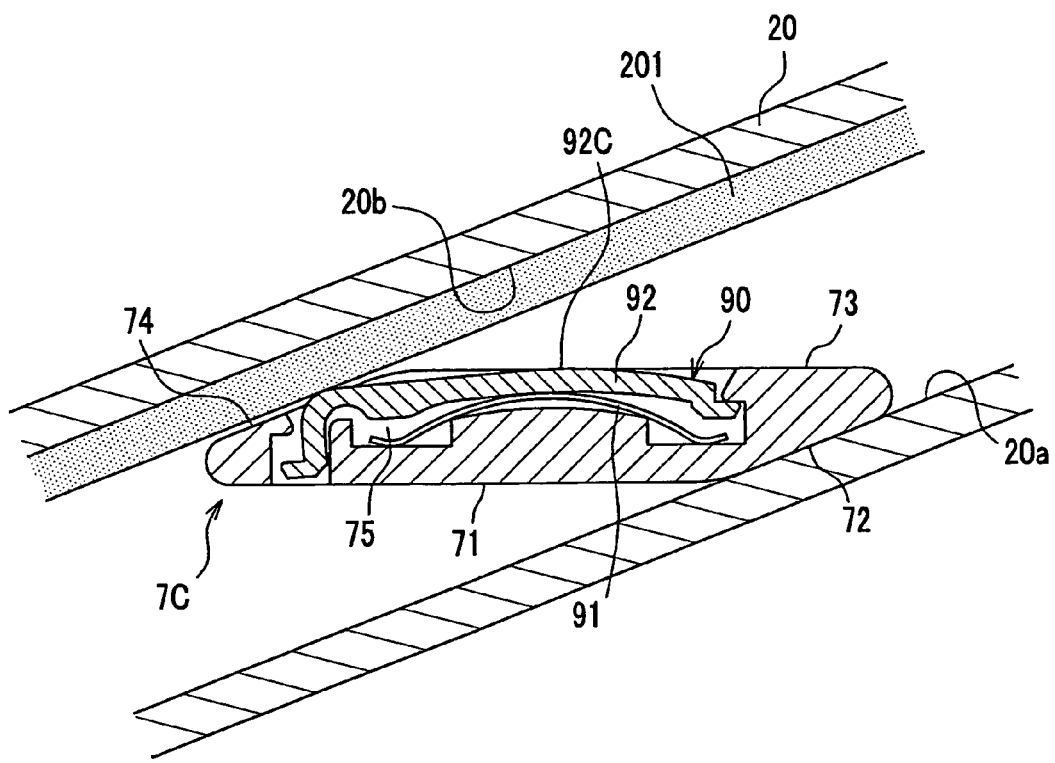
FIG. 18 is an explanatory view of the second modification, illustrating an operation of the rear slider when the rear slider is positioned in the slanted rail.

In this second modification, it is possible to employ the rear slider 7C according to the first modification as shown in FIGS. 11-14. Although it is defined in the claims that the pressing member abuts on the upper surface of the slanted rail, in the case in which the upper buffer member 201 is provided on the upper surface 20b of the slanted rail 20 as shown in FIG. 18, "the upper surface of the slanted rail" on which the spring mechanism 90 (pressing member 92) abuts does not indicate the upper surface 20b but the surface of the upper buffer member 201.

In order to reduce an increment of the sliding resistance between the upper buffer member 201 and the rear slider 7C due to the use of rubber buffer member, lubricant such as silicone grease can be applied on the surface of the upper buffer member 201.

In addition to or instead of providing the upper buffer member 201 on the upper surface 20b of the slanted rail 20, a buffer member may be provided on the bottom surface 20a of the slanted rail 20.

Third Modification

According to the third modification, the front slider of the rear-side sunshade panel is arranged, as viewed from side, at a position on a front end of the rear-side sunshade panel or ahead of the front end of the rear-side sunshade panel.

As previously described, in the process of movement from the state shown in FIG. 6(b) to the state shown in FIG. 6(C), the front slider 6C is guided by the upper rail 8A to restrict the vertical displacement of the front slider 6C as shown in FIG. 7. Therefore, the rear slider 7C shown in FIG. 8 slides up along the slanted rail 20 while slightly rotating in the counterclockwise direction with the front slider 6C that slides rearward under the restriction of the vertical displacement as an instantaneous center. This means that the sunshade panel 5C rotates with the front slider 6C as an instantaneous center in a manner such that the rear end thereof is lifted up.

Figure 19:
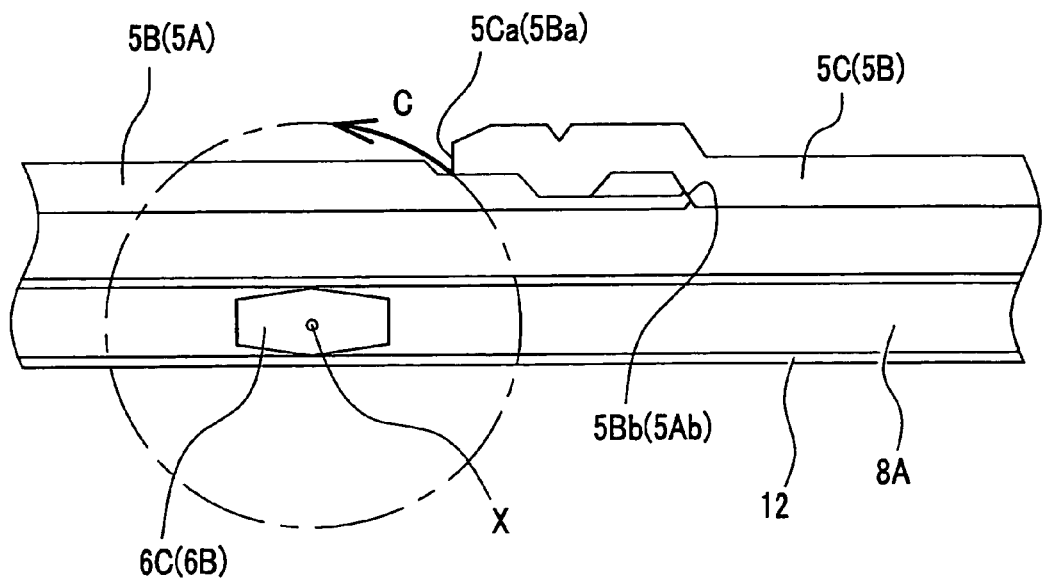
FIG. 19 is an explanatory view of a third modification, illustrating an instantaneous center of the sunshade panel.

According to the third modification, as seen in FIG. 19, the front slider 6C is arranged, as viewed from side, at a position ahead of the front end 5Ca of the sunshade panel 5C. Therefore, when the sunshade panel 5C rotates with the front slider 6C as the instantaneous center X in a manner such that the rear end thereof is lifted up, the front end 5Ca of the sunshade panel 5C rotates and moves upward in the direction shown by arrow C with the front slider 6C as the instantaneous center X. Since the front end 5Ca of the rear-side sunshade panel 5C moves in a direction away from the rear end 5Bb of the front-side sunshade panel 5B, interference between the rear end 5Bb of the front-side sunshade panel 5B and the front end 5Ca of the rear-side sunshade panel 5C can be prevented.

The same arrangement can be applied to the sunshade panel 5B. The front slider 6B is arranged, as viewed from side, at a position ahead of the front end 5Ba of the sunshade panel 5B. When the sunshade panel 5B rotates and moves upward in the direction shown by arrow C with the front slider 6B as the instantaneous center X, the front end 5Ba of the rear-side sunshade panel 5B moves in a direction away from the rear end 5Ab of the front-side sunshade panel 5A. Therefore, interference between the rear end 5Ab of the front-side sunshade panel 5A and the front end 5Ba of the rear-side sunshade panel 5B can be prevented.

Upon closing the sunshade panels 5A-5C, the sunshade panel 5B rotates with the front slider 6B as the instantaneous center X in a manner such that the rear end thereof is lifted up, during which the front end 5Ba of the rear-side sunshade panel 5B moves in a diagonally downward direction from a position higher than the rear end 5Ab of the front-side sunshade panel 5A. This can prevent interference between the rear end 5Ab of the front-side sunshade panel 5A and the front end 5Ba of the rear-side sunshade panel 5B.

According to the third modification, the rear-side sunshade panels 5C, 5B of the three sunshade panels 5A-5-C arranged in line along the longitudinal direction of the vehicle slide up along the slanted rail 20 while the rear ends of the sunshade panels 5C, 5B are rotated and moved upward, and the front-side sunshade panels 5B, 5A move under and are superposed below the rear-side sunshade panels 5C, 5B. During the opening/closing operation of the sunshade panels 5A-5C, the interference between the rear end 5Bb (5Ab) of the front-side sunshade panel 5B (5A) and the front end 5Ca (5Ba) of the rear-side sunshade panel 5C (5B) can be prevented, and so the engagement/disengagement of the sunshade panels 5A-5C can be performed smoothly. This makes it possible to improve the quality of the sunshade device 1.

Other than the arrangement in which the front slider 6C (6B) that is an instantaneous center X for the rear-side sunshade panel 5C (5B) is arranged, as viewed from side, at a position ahead of the front end 5Ca (5Ba) of the rear-side sunshade panel 5C (5B), the front slider 6C (6B) may be arranged, as viewed from side, at a position on the front end 5Ca (5Ba) of the rear-side sunshade panel 5C (5B), that is, on the same position as the front end 5Ca (5Ba) of the rear-side sunshade panel 5C (5B). Even in this arrangement, the interference between the rear end 5Bb (5Ab) of the front-side sunshade panel 5B (5A) and the front end 5Ca (5Ba) of the rear-side sunshade panel 5C (5B) can be prevented. According to the present invention, "the front slider 6C (6B) is arranged, as viewed from side, at a position on the front end 5Ca (5Ba) of the rear-side sunshade panel 5C (5B)" indicates a state in which at least the front slider 6C (6B) partly overlaps the front end 5Ca (5Ba) of the rear-side sunshade panel 5C (5B) as viewed from side.

Fourth Modification

According to the fourth modification, a supporting bracket is attached on both side portions of each sunshade panel to form the front and rear sliders, and further the cam pin is formed on the front-side sunshade panel at a rear end of the supporting bracket, and the cam groove is formed on the rear-side sunshade panel at a front end of the bracket. The sunshade device further comprises a mechanism which returns the cam pin to a normal sliding locus, if adjacent sunshade panels are come off from each other and the cam pin deviates from the normal sliding locus, as a result that the sunshade panels are opened and the front-side sunshade panel presses the rear-side sunshade panel rearward at rear end portions of the supporting brackets attached to the front-side sunshade panel, and that the front and rear sliders of the rear-side sunshade panel are released from a vertical movement restriction by the guide rails at a predetermined position of the rear-side sunshade panel, and further that the front-side sunshade panel lifts up the rear-side sunshade panel. Furthermore, the sunshade device further comprises a mechanism for preventing a contact between the rear end of the front-side sunshade panel and the front end of the rear-side sunshade panel, so that at a time when the rear end portions of the supporting brackets of the front-side sunshade panel contact with front end portions of the supporting brackets of the rear-side sunshade panel, the rear end of the front-side sunshade panel and the front end of the rear-side sunshade panel do not come in contact with each other, and at a time when the rear end portions of the supporting brackets of the front-side sunshade panel lifts up the front end portions of the supporting brackets of the rear-side sunshade panel, the front end portions of the rear-side sunshade panel are lifted up to prevent a contact with the front-side sunshade panel.

Figure 20:
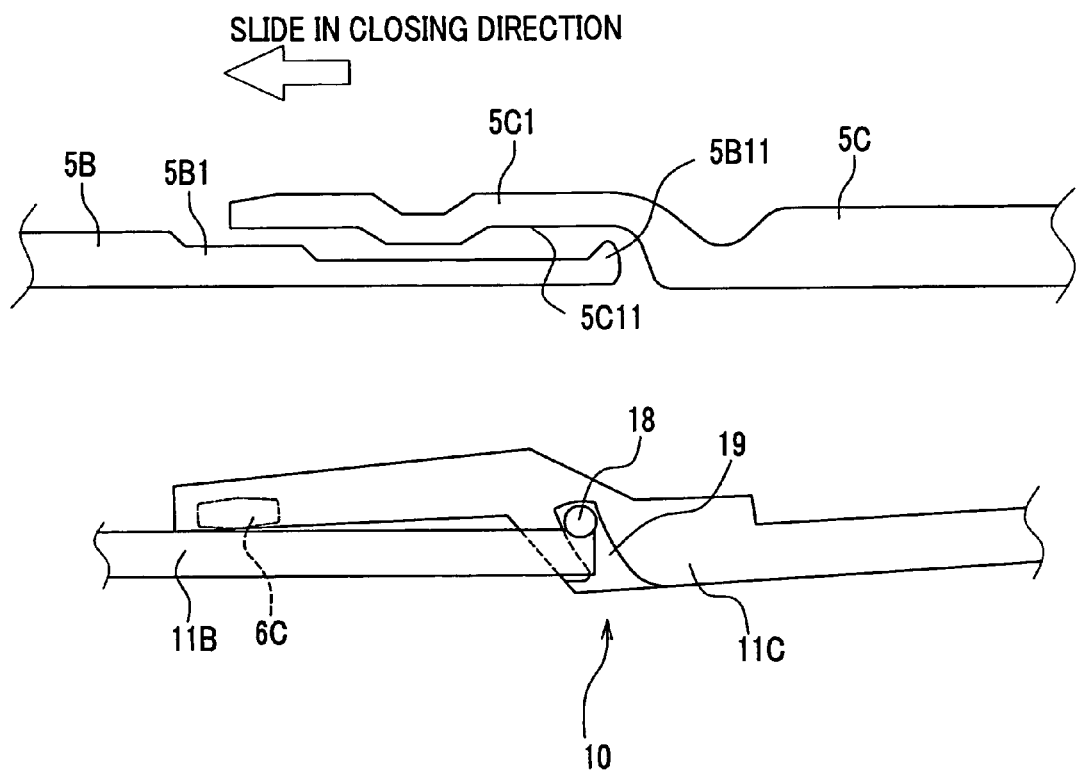
FIG. 20 shows a fourth modification, in which the movements of adjacent sunshade panels are shown in section.

FIG. 20 is an enlarged sectional view showing the connecting mechanism 10 during the sliding movement of the sunshade panels 5A-5C. Adjacent sunshade panels 5B, 5C are positioned such that the front end portion 5C1 of the rear-side sunshade panel 5C overlaps the rear end portion 5B1 of the front-side sunshade panel 5B. To be more specific, a hook portion 5B11 provided at the rear end portion 5B1 of the front-side sunshade panel 5B is positioned in a groove portion 5C11 provided at the front end portion 5C1 of the rear-side sunshade panel 5C. In this position of the sunshade panels 5b, 5C, the cam pin 18 provided on the supporting bracket 11B of the front-side sunshade panel 5B is engaged with the cam groove 19 formed on the supporting bracket 11C of the rear-side sunshade panel 5C.

Figure 21A:
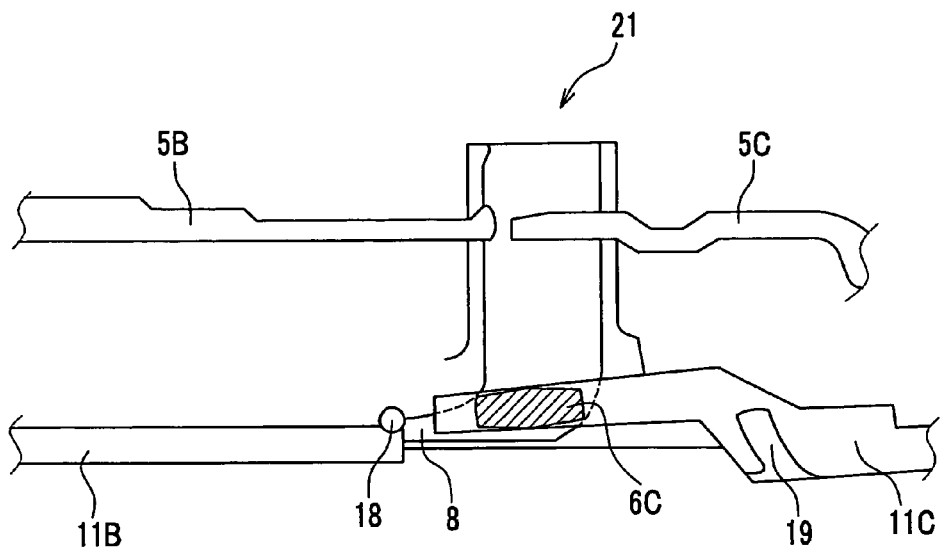
FIGS. 21A and 21B are enlarged explanatory views as a comparative example of the fourth modification, illustrating adjacent sunshade panels without adapting the fourth modification.
Figure 21B:
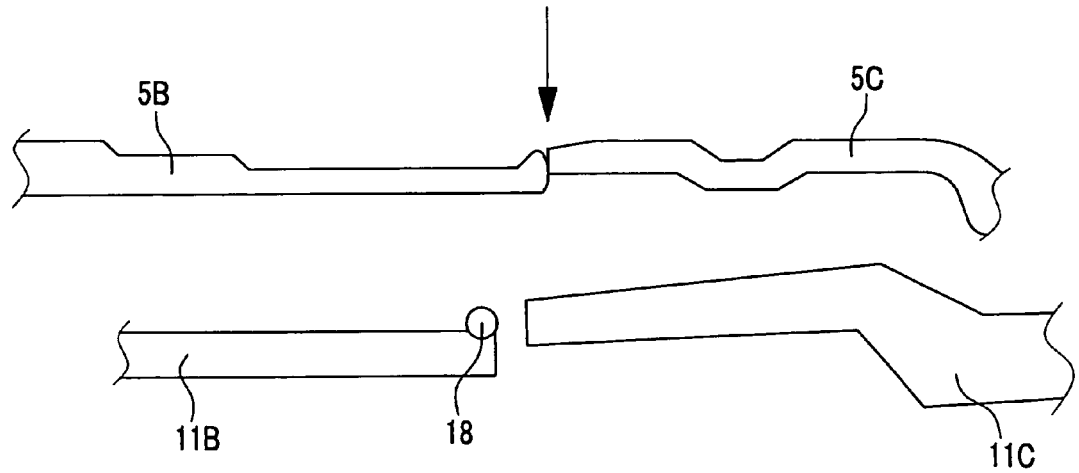
Figure 22A:
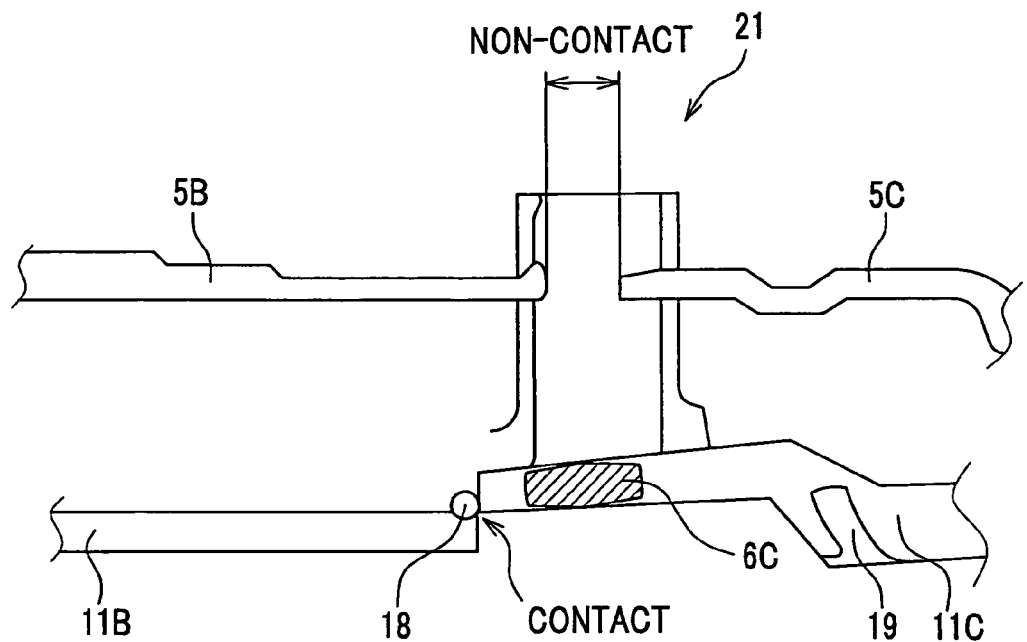
FIGS. 22A and 22B are enlarged explanatory views, illustrating adjacent sunshade panels to which the fourth modification is adapted.
Figure 22B:
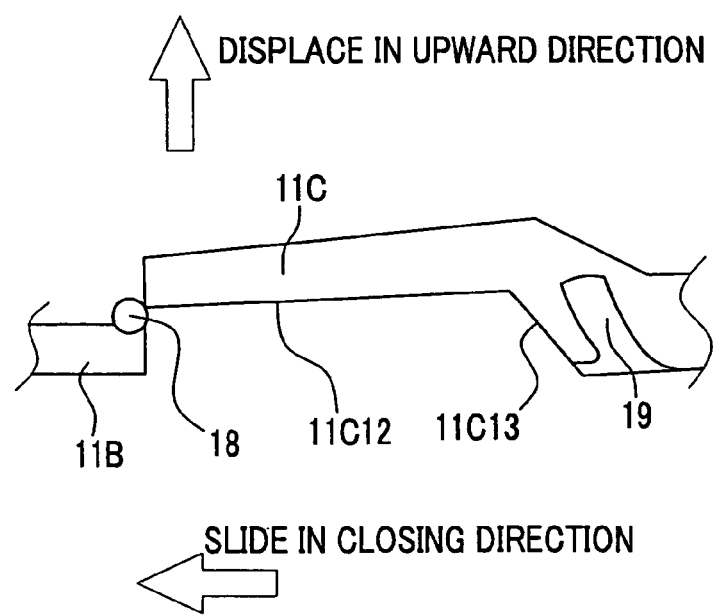

Operation of the sunshade device 1 according to this modification will be described. In order to make this modification easily understood, a description will be given of a comparative example shown in FIGS. 21A and 21B, which illustrate the sunshade panels without adapting the fourth embodiment. In FIG. 21A, when the sunshade panels 5A-5C are closed, an upward external force is applied and the front end portion 5C1 of the rear-side sunshade panel 5C (FIG. 20) is lifted up, so that the front end portion 5C1 of the rear-side sunshade panel 5C is disengaged from the rear end 5B1 of the front-side sunshade panel 5B (FIG. 20). FIG. 21B is an enlarged sectional view showing the relation between the front slider 6C of the rear-side sunshade panel 5C and the cam pin 18 of the front-side sunshade panel 5B when interference occurs between the front end portion 5C1 of the rear-side sunshade panel 5C and the rear end portion 5B1 of the front-side sunshade panel 5B during the opening operation of the sunshade panels 5A-5C. FIG. 22A is an enlarged sectional view of the sunshade panels 5B, 5C according to the fourth modification, and FIG. 22B is an explanatory view of the fourth modification, illustrating a state in which the engagement between the sunshade panels 5B, 5C is recovered.

As seen in FIG. 20, when the sunshade panels 5A-5C are closed, the sunshade panel 5B and the sunshade panel 5C are engaged and cooperatively slide along the guide rail 8 (FIG. 2). However, when the front slider 6C of the supporting bracket 11C is positioned below the front slider releasing part 21 (see FIG. 21A), the front slider 6C is released from the vertical movement restriction by the guide rail 8. In this position of the front slider 6C, if an upward external force is applied to the rear-side sunshade panel 5C, the engagement of the connecting mechanism 10 is disengaged. Since the front-side sunshade panel 5B continuously slides in the leftward direction of FIG. 21A, the sunshade panel 5B and the sunshade panel 5C are left disengaged. The upward external force is applied, for instance, when an arm or the head of a passenger bumps into the rear-side sunshade panel 5C, to thereby accidentally press the sunshade panel 5C in the upward direction.

As seen in FIG. 21B, if the engagement of the connecting mechanism 10 is disengaged and the sunshade panel 5B and the sunshade panel 5C are separate from each other, the front end portion 5C1 of the rear-side sunshade panel 5C (FIG. 20) and the rear end portion 5B1 of the front-side sunshade panel 5B (FIG. 20) may strike each other when the sunshade panels 5B, 5C slide to open. As a result, there may be possibilities that the sunshade panel 5B and the sunshade panel 5C do not return to the original engagement state and that an unreasonable force is applied to the sunshade panels 5B, 5C.

On the contrary, according to the sunshade device to which the present invention is applied, as seen in FIG. 22A, when the sunshade panels 5A-5C are opened, the front end portion of the supporting bracket 11C of the rear-side sunshade panel 5C contacts the rear end portion (cam pin 18) of the supporting bracket 11B of the front-side sunshade panel 5B before the front end portion 5C1 of the rear-side sunshade panel 5C (FIG. 20) and the rear end portion 5B1 of the front-side sunshade panel 5B (FIG. 20) come in contact with each other.

Since the rear slider 7B of the front-side sunshade panel 5B slides along the lower rail 8B, the front-side sunshade panel 5B is restrained in the vertical directions of FIG. 22B. Meanwhile, the rear-side sunshade panel 5C is released from the restriction of the upward movement because the front slider 6C of the rear-side sunshade panel 5C is positioned below the front slider releasing part 21 that is formed at the rear end portion of the upper rail 8A. In this position, the rear slider 7C of the rear-side sunshade panel 5C reaches the upper end of the slanted rail 20 (FIG. 2) so that the front slider 6C of the rear-side sunshade panel 5C is not allowed to slide further in the backward direction.

Therefore, when the front-side sunshade panel 5B opens, that is, slides in the rightward direction of FIG. 22B, the front end portion of the rear-side sunshade panel 5C is lifted up by the upward curved surface of the cam pin 18, so that the height of the front end portion of the rear-side sunshade panel 5C becomes higher than that of the rear end portion of the front-side sunshade panel 5B. This can prevent a contact between the rear end portion of the front-side sunshade panel 5B and the front end portion of the rear-side sunshade panel 5C. The cam pin 18 slides in the backward direction and in turn passes from the front end of the rear-side sunshade panel 5C and the lower surface 11C12 of the supporting bracket 11C, and then comes in contact with the slanted wall 11C13 that extends in a diagonally downward and rearward direction, thereafter slides down along the slanted wall 11C13. Therefore, the front end portion of the supporting bracket 11C is lifted up further.

The cam pin 18 passes beneath the slanted wall 11C13 and then returns to the normal sliding locus, that is, the position as shown in FIG. 6(e).

When the sunshade panels 5A-4C are closed, the sunshade panel 5B lowers and slides forward so that the front end portion 5C1 of the rear-side sunshade panel 5C overlaps the rear end portion 5B1 of the front-side sunshade panel 5B and the hook portion 5B11 provided at the rear end portion 5B1 of the front-side sunshade panel 5B comes into engagement with the groove portion 5C11 provided at the front end portion 5C1 of the rear-side sunshade panel 5C. Therefore, the sunshade panel 5B and the sunshade panel 5C again come into engagement with each other into the state as shown in FIG. 20.

As described above, according to the fourth modification, even if the adjacent sunshade panels 5B, 5C are disengaged during the sliding movement of the sunshade panels 5A-5C, sliding the sunshade panels 5A-5C in the backward direction to open the sunshade panels 5A-5C enables the adjacent front-side sunshade panel 5B and rear-side sunshade panel 5C to be returned to the normal sliding locus without occurring interference between these adjacent sunshade panels 5B, 5C. Thereafter, sliding the sunshade panels 5A-5C in the forward direction to close the sunshade panels 5A-5C enables the adjacent front-side sunshade panel 5B and rear-side sunshade panel 5C to come into engagement with each other.

Applicants has filed a co-pending application based on Japanese Patent Application Nos. 2005-375114, 2006-225146, and 2006-225147, the disclosures of which are herein incorporated by reference in their entirety.

What is claimed is:

1. A sunshade device for a vehicle comprising:
a plurality of sunshade panels mounted in an inner opening of a vehicular roof along a longitudinal direction of the vehicle, the sunshade panels being arranged in line along the longitudinal direction of the vehicle in a closed state of the sunshade panels;
a pair of front and rear sliders each provided at both side portions of each sunshade panel;
a pair of guide rails for guiding a linear sliding movement of the front and rear sliders;
a drive source connected to a forefront sunshade panel; and
a connecting mechanism for detachably connecting adjacent sunshade panels such that each of the sunshade panels is cooperatively opened and closed;
wherein a sunshade panel positioned at a rear portion of the guide rails is lifted up so that a front-side sunshade panel positioned in front of this rear-side sunshade panel moves under and is superposed below the rear-side sunshade panel,
wherein the adjacent sunshade panels have a cam mechanism including at least one cam pin formed on one sunshade panel, and at least one cam groove formed on the other sunshade panel corresponding to the cam pin and having one end thereof opened to guide the cam pin, wherein the sunshade device further includes a pair of slanted rails provided at rear ends of the guide rails and extending in a diagonally upward and rearward direction, and a pair of front slider releasing parts positioned above the front sliders at a time when the rear sliders slide up along the slanted rails to a predetermined position, wherein when the sunshade panels are opened, the rear sliders of the rear-side sunshade panel are elevated to the predetermined position along the pair of slanted rails, and thereafter by a movement of the cam pin within the corresponding cam groove, the front sliders are elevated through the front slider releasing parts with the rear sliders as a center of rotation, and wherein the cam pin comes off from the end of the corresponding cam groove, and the front-side sunshade panel moves rearward and is positioned below the rear-side sunshade panel.

2. A sunshade device for a vehicle according to claim 1, further comprising a pair of deviation prevention walls which guide with the slanted rails the rear-side sunshade panel in the longitudinal direction of the vehicle at a time when the rear-side sunshade panel is positioned in a retracted position and which prevent a deviation of the rear-side sunshade panel in the longitudinal direction of the vehicle.

3. A sunshade device for a vehicle according to claim 1, wherein the cam pin is formed on the front-side sunshade panel and the cam groove is formed on the rear-side sunshade panel, wherein the cam groove extends in a diagonally downward and rearward direction with its lower end opened and comprises a slanted upper cam surface and a slanted lower cam surface, and wherein a lower end of the slanted lower cam surface is positioned below a lower end of the slanted upper cam surface such that when the sunshade panels are closed, the cam pin that is left disengaged and linearly moves in a forward direction is guided in and engaged with the corresponding cam groove.

4. A sunshade device for a vehicle according to claim 1, wherein the rear slider comprises a first sliding surface in contact with a bottom surface of the guide rail, and a second sliding surface in contact with a bottom surface of the slanted rail, and wherein the sunshade device is provided with a spring mechanism which abuts on an upper surface of the guide rail or an upper surface of the slanted rail and presses by a reaction force received therefrom the first sliding surface and the second sliding surface against the bottom surface of the guide rail and the bottom surface of the slanted rail, respectively.

5. A sunshade device for a vehicle according to claim 4, wherein the spring mechanism is mounted on the rear slider, and wherein the spring mechanism comprises a pressing member which abuts on the upper surface of the guide rail or the upper surface of the slanted rail, and a plate spring which is made of metal and placed between the pressing member and the rear slider.

6. A sunshade device for a vehicle according to claim 1, wherein the front sliders of the rear-side sunshade panel are arranged, as viewed from side, at positions on a front end of the rear-side sunshade panel or ahead of the front end of the rear-side sunshade panel.

7. A sunshade device for a vehicle according to claim 1, further comprising a first buffer member which is provided at least on a part of a sliding groove formed in the slanted rail and which absorbs a backlash of the rear slider, and a second buffer member which absorbs an impact to be applied at a time when the rear slider moves from the slanted rail to the guide rail.

8. A sunshade device for a vehicle according to claim 7, wherein each of the first buffer member and the second buffer member is a discrete member from the slanted rail.

9. A sunshade device for a vehicle according to claim 1, wherein a supporting bracket is attached on both side portions of each sunshade panel to form the front and rear sliders, wherein the cam pin is formed on the front-side sunshade panel at a rear end of the supporting bracket, and the cam groove is formed on the rear-side sunshade panel at a front end of the bracket, and wherein the sunshade device further comprises a mechanism which returns the cam pin to a normal sliding locus, if adjacent sunshade panels disengage from each other and the cam pin deviates from the normal sliding locus, as a result that the sunshade panels are opened and the front-side sunshade panel presses the rear-side sunshade panel rearward at rear end portions of the supporting brackets attached to the front-side sunshade panel, and that the front and rear sliders of the rear-side sunshade panel are released from a vertical movement restriction by the guide rails at a predetermined position of the rear-side sunshade panel, and further that the front-side sunshade panel lifts up the rear-side sunshade panel.

10. A sunshade device for a vehicle according to claim 9, further comprising a mechanism for preventing a contact between a rear end of the front-side sunshade panel and a front end of the rear-side sunshade panel, so that at a time when the rear end portions of the supporting brackets of the front-side sunshade panel contact with front end portions of the supporting brackets of the rear-side sunshade panel, the rear end of the front-side sunshade panel and the front end of the rear-side sunshade panel resist contact with each other, and at a time when the rear end portions of the supporting brackets of the front-side sunshade panel lifts up the front end portions of the supporting brackets of the rear-side sunshade panel, the front end portions of the rear-side sunshade panel are lifted up to prevent a contact with the front-side sunshade panel.

11. A sunshade device for a vehicle according to claim 2, wherein the cam pin is formed on the front-side sunshade panel and the cam groove is formed on the rear-side sunshade panel, wherein the cam groove extends in a diagonally downward and rearward direction with its lower end opened and comprises a slanted upper cam surface and a slanted lower cam surface, and wherein a lower end of the slanted lower cam surface is positioned below a lower end of the slanted upper cam surface such that when the sunshade panels are closed, the cam pin that is left disengaged and linearly moves in a forward direction is guided in and engaged with the corresponding cam groove.

12. A sunshade device for a vehicle according to claim 4, further comprising a first buffer member which is provided at least on a part of a sliding groove formed in the slanted rail and which absorbs a backlash of the rear slider, and a second buffer member which absorbs an impact to be applied at a time when the rear slider moves from the slanted rail to the guide rail.

13. A sunshade device for a vehicle according to claim 12, wherein each of the first buffer member and the second buffer member is a discrete member from the slanted rail.

* * * * *